US009405466B2

(12) United States Patent
Suraqui

(10) Patent No.: US 9,405,466 B2
(45) Date of Patent: *Aug. 2, 2016

(54) REDUCED KEYBOARD WITH PREDICTION SOLUTIONS WHEN INPUT IS A PARTIAL SLIDING TRAJECTORY

(71) Applicant: Nuance Communications, Inc., Burlington, MA (US)

(72) Inventor: Daniel Suraqui, Jerusalem (IL)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,501

(22) Filed: Dec. 22, 2014

(65) Prior Publication Data

US 2015/0242119 A1    Aug. 27, 2015

Related U.S. Application Data

(63) Continuation of application No. 13/189,512, filed on Jul. 24, 2011, now Pat. No. 8,918,734.

(60) Provisional application No. 61/368,302, filed on Jul. 28, 2010.

(51) Int. Cl.
*G06F 3/0488* (2013.01)
*G06F 17/27* (2006.01)

(52) U.S. Cl.
CPC ........ *G06F 3/04886* (2013.01); *G06F 3/04883* (2013.01); *G06F 17/276* (2013.01); *G06F 17/2735* (2013.01)

(58) Field of Classification Search
CPC ............. G06F 3/00; G06F 3/01; G06F 3/016; G06F 1/1626; G06F 3/033; G06F 3/041; G06F 3/048; G06F 3/0481; G06F 3/0482; G06F 3/04886; G06F 3/04883; G06F 9/4443; G06F 3/0488; G06F 3/03545; G06F 3/0202; G06F 3/0238; G06F 3/0338; G06F 17/27; G06F 17/276; G06F 17/2735; G06F 17/2775; H04H 13/702; G06K 9/07; G06K 9/72
See application file for complete search history.

(56) References Cited

U.S. PATENT DOCUMENTS

| 5,677,710 | A  | 10/1997 | Thompson-Rohrlich |
| 5,832,474 | A  | 11/1998 | Lopresti et al.   |
| 5,926,566 | A  | 7/1999  | Wang et al.       |
| 6,614,422 | B1 | 9/2003  | Rafii et al.      |
| 6,646,572 | B1 | 11/2003 | Brand             |
| 6,718,060 | B1 | 4/2004  | Yokota et al.     |
| 7,098,896 | B2 | 8/2006  | Kushler et al.    |
| 7,175,438 | B2 | 2/2007  | Levy              |
| 7,199,786 | B2 | 4/2007  | Suraqui           |
| 7,250,938 | B2 | 7/2007  | Kirkland et al.   |
| 7,251,367 | B2 | 7/2007  | Zhai              |

(Continued)

*Primary Examiner* — Xiomar L Bautista
(74) *Attorney, Agent, or Firm* — Perkins Coie LLP

(57) ABSTRACT

A reduced virtual keyboard system for text input on electronic devices is disclosed. Text input is performed by creating a tracing trajectory. Dynamic prediction solutions are created during the tracing process, thus avoiding the need for a user to complete the entire word trajectory. The system also allows a mixture of tapping actions and sliding motions for the same word. The system may comprise a Long Words Dictionary database having first letters corresponding to predetermined keys of the keyboard. Alternatively, the system uses a Dictionary and a database management tool to find long words.

20 Claims, 18 Drawing Sheets

(56) References Cited

U.S. PATENT DOCUMENTS

| | | |
|---|---|---|
| 7,382,358 B2 | 6/2008 | Kushler et al. |
| 7,895,518 B2 | 2/2011 | Kristensson |
| 8,918,734 B2 | 12/2014 | Suraqui |
| 2007/0040813 A1 | 2/2007 | Kushler et al. |
| 2008/0189605 A1 | 8/2008 | Kay et al. |
| 2009/0106695 A1 | 4/2009 | Perry et al. |
| 2009/0163137 A1* | 6/2009 | Capparelli ............ H04H 60/06 455/3.06 |
| 2010/0026650 A1* | 2/2010 | Srivastava ............ G06F 3/0237 345/173 |
| 2010/0131900 A1* | 5/2010 | Spetalnick ............ G06F 17/276 715/825 |
| 2010/0171700 A1* | 7/2010 | Sharan ................ G06F 3/0237 345/161 |
| 2010/0225599 A1 | 9/2010 | Danielsson et al. |
| 2010/0283736 A1* | 11/2010 | Akabane ............... G06F 17/276 345/168 |
| 2011/0029869 A1* | 2/2011 | McLennan ............. G06F 3/017 715/702 |
| 2011/0035696 A1* | 2/2011 | Elazari ................ G06F 3/0233 715/773 |
| 2011/0071818 A1* | 3/2011 | Jiang .................... G06F 3/0236 704/8 |
| 2011/0119617 A1 | 5/2011 | Kristensson |
| 2011/0141027 A1 | 6/2011 | Ghassabian |

\* cited by examiner

REDUCED KEYBOARD WITH PREDICTION SOLUTIONS WHEN INPUT IS A PARTIAL SLIDING TRAJECTORY

CROSS REFERENCE TO RELATED APPLICATIONS

This application is a continuation of U.S. application Ser. No. 13/189,512, filed Jul. 24, 2011, now issued U.S. Pat. No. 8,918,734, which claims the benefit of U.S. Provisional Application No. 61/368,302, filed Jul. 28, 2010, whose disclosure is incorporated herein by reference.

FIELD AND BACKGROUND OF THE INVENTION

The present invention relates generally to the field of mobile and handheld electronic devices with touch screens. More specifically, the present invention relates to a reduced keyboard, and a method associated for sliding capabilities and even more specifically to a method of recognizing a long word when input is a partial word trajectory of the word.

In the specification and the claims, which follow herein the terms "keyboard" and "keypad" are intended to mean a grouping of individual keys, as known in the art, used primarily for text input. "Reduced keyboard" and/or "reduced keypad", as used hereinbelow in the specification and the claims, are intended to mean a keyboard and/or a keypad having reduced dimensions, such as found in, but not limited to, handheld electronic devices. In many (but not all) cases, a reduced keyboard is additionally a "virtual keyboard", meaning a display of a keyboard on a touch screen—as opposed to a physical keyboard having physical keys.

In the specification and claims which follow, the following terms are identified and defined, in conjunction with a virtual keyboard:

"sliding capability" and/or "word sliding" is intended to mean a method of inputting successive letters in a word by moving a cursor, finger, pen, remote control, or other pointing device, which is maintained in contact with the virtual keyboard, from one letter to the next letter, using in a virtual keyboard. (In the case of a cursor or other pointing device, "maintained in contact" is typically accomplished by maintaining the left mouse button depressed while moving the cursor.)

"word tracing", "word trajectory", "sliding trajectory", and/or simply "trajectory" and "tracing" are intended to mean the pattern resulting from word sliding. Typically, the trajectory is defined from when the cursor, finger, or other pointing device first makes contact with the virtual keyboard until when contact with the cursor, finger, or other pointing device and the keyboard is interrupted, as further described hereinbelow.

Reduced keyboards with sliding capabilities have recently been widely applied for touch-screen devices, i.e. "virtual keyboards". Presently, three patents (as well as subsequently issued and related patents by the respective inventors) are related to three respective products, namely: U.S. Pat. No. 7,199,786 (Suraqui, herein referred to as '786) having a related product called SlideIT® (which is also applicable to large screens with personal computer); U.S. Pat. No. 7,098,896 and subsequent patents by Kushler and Marsden, related to a product called Swype®; and U.S. Pat. No. 7,251,367 (Shumin Zhai) related to a product called Shapewriter®— respectively incorporated herein by reference. Two other patents have no currently known commercially related products, namely: U.S. Pat. No. 7,175,438 (Levy); and U.S. Pat. No. 7,250,938 (Kirkland et al.), which are incorporated herein by reference.

A sliding capability is very effective for short words (words usually having less than 6 or 7 letters) because the user can memorize a trajectory associated with the short word sliding. As a result, word sliding for short words is significantly faster than is for conventional word tapping (i.e. sequentially touching individual keys in a conventional, non-sliding manner) for the same short word. However in general, when considering long words (i.e. words usually having more than 6 or 7 letters) conventional tapping can be more efficient than word sliding.

Firstly, it is more difficult to memorize a sliding trajectory corresponding to a long word as compared to a trajectory for a short word. Secondly, sliding for a long word takes more time than word sliding for a shorter word. Additionally, as can intuitively be grasped, the risk of making errors in the trajectory increases with the length of a word/trajectory.

U.S. Pat. No. 7,895,518 (Kristenson) describes a system which displays words during tracing. However the displayed solutions are only the ones corresponding to the current trajectory (disambiguation). In some instances the system can recognize uncompleted words for instance when the user traces "th" the system can recognize "the" because the sub-word "th" is mapped to the word "the" in the lexicon. Such a method can be applied only for a limited number of words because it will request a huge amount of storage space, it is likely it could not work in real time and because of the huge size of the dictionary the number of wrong solutions could be unbearable. As an example in order to recognize the word "constitution" during all the step of the tracing process the sub-words "co", "con", "cons", "const", "consti", "constit", "constitu", "constitut", "constituti", and "constitutio" should be part of the lexicon. The present invention works with the same dictionary needed for the regular sliding and does not request any additional new words or parts of words.

It is therefore desirable to create a keyboard input method in which long words may be efficiently and effectively input using word sliding by making predictions during the sliding process and giving the user the option to select the full long word at an early stage thus allowing time savings as well as having high reliability of prediction.

SUMMARY OF THE INVENTION

According to the teachings of the present invention there is provided a system for disambiguating a text input of a sub-word of a long word on an electronic device, comprising: a virtual keyboard having a plurality of virtual keys; an input pointing device adapted for inputting the text input by the pointing device being placed on a key of the keyboard corresponding to the first character of the sub-word, and then by being moved to subsequent keys corresponding to subsequent characters of the sub-word, so as to produce a trajectory pattern; a dictionary database associated with the keyboard and the pointing device, the dictionary database comprising words and associated frequencies of usage; a long word dictionary (LWD) derived from the dictionary database, having a smaller size than that of the dictionary database and configured according to an arrangement of the keys in the keyboard; and a partial trajectory recognition module associated with the keyboard and the pointing device, wherein the trajectory pattern is evaluated to produce sub-word solutions; wherein the sub-word solutions are used in conjunction with the LWD to selectively recognize at least one prediction solution corresponding to at least one long word.

Preferably, the input pointing device is at least one chosen from the list including: a finger; a mouse; a remote control; and a pen. Most preferably, the trajectory pattern is creatable using the pointing device by at least one chosen from the list including: tapping; tracing; and a combination of tapping and tracing. Typically, the LWD has a plurality of classes, each of the classes containing long words having a first letter corresponding to predetermined keys of the keyboard. Most typically, the number of words included in the LWD is limitable by at least one LWD parameter. Preferably, the at least one LWD parameter is chosen from the list including: maximum number of letters; and minimum frequency. Most preferably, the arrangement of the keys in the keyboard is adapted to the respective language used and chosen from a list including: QWERTY; Dvorak; AZWRTY, Svorak, and Colemak.

Typically, further including a means for generating and/or erasing the at least one word prediction solution during tracing. Most typically, the at least one prediction solution is displayed following a finger-move and a long-press. Preferably, further including a means for determining possible intermediate letter candidates of the long word according to a partial trajectory.

According to the teachings of the present invention there is further provide a method of disambiguating a text input of a sub-word of a long word on an electronic device, comprising the steps of: taking a virtual keyboard having a plurality of virtual keys; using an input pointing device to input the text input by placing the pointing device on a key of the keyboard corresponding to the first character of the sub-word, and then moving the pointing device to subsequent keys corresponding to subsequent characters of the sub-word, so as to produce a trajectory pattern; configuring dictionary database associated with the keyboard and the pointing device, the dictionary database comprising words and associated frequencies of usage; deriving a long word dictionary (LWD) from the dictionary database, the LWD having a smaller size than that of the dictionary database and configured according to an arrangement of the keys in the keyboard; and evaluating the trajectory pattern in a partial trajectory recognition module associated with the keyboard and the pointing device and producing sub-word solutions; whereby the sub-word solutions are used in conjunction with the LWD to selectively recognize at least one word prediction solution corresponding to at least one long word.

Preferably, the input pointing device is at least one chosen from the list including: a finger; a mouse; a remote control; and a pen. Most preferably, the trajectory pattern is created using the pointing device by at least one chosen from the list including: tapping; tracing; and a combination of tapping and tracing. Typically, the LWD has a plurality of classes, each of the classes containing long words having a first letter corresponding to predetermined keys of the keyboard. Most typically, the number of words included in the LWD is limited by at least one LWD parameter. Preferably, the at least one LWD parameter is chosen from the list including: maximum number of letters; and minimum frequency. Most preferably, the arrangement of the keys in the keyboard is adapted to the respective language used and chosen from a list including: QWERTY; Dvorak; AZWRTY, Svorak, and Colemak.

Typically, further including a means for generating and erasing the at least one word prediction solution during tracing. Most typically, the at least one prediction solution is displayed following a finger-move. Preferably, the at least one prediction solution is displayed following a finger-up. Most preferably, further including a means for determining possible intermediate letter candidates of the long word according to a partial trajectory.

According to the teachings of the present invention there is further provided a method of disambiguating a text input of a sub-word of a long word on an electronic device, comprising the steps of: taking a virtual keyboard having a plurality of virtual keys; using an input pointing device to input the text input by placing the pointing device on a key of the keyboard corresponding to the first character of the sub-word, and then moving the pointing device to subsequent keys corresponding to subsequent characters of the sub-word, so as to produce a trajectory pattern; configuring a dictionary database associated with the keyboard and the pointing device, the dictionary database comprising words and associated frequencies of usage; and utilizing a database management tool to operate upon the dictionary database; and evaluating the trajectory pattern in a partial trajectory recognition module associated with the keyboard and the pointing device and producing sub-word solutions; whereby the sub-word solutions are used in conjunction with the dictionary database and the database management tool to selectively recognize at least one word prediction solution corresponding to at least one long word.

According to the teachings of the present invention there is further provided a system for disambiguating a text input of a sub-word of a long word on an electronic device, comprising: a virtual keyboard having a plurality of virtual keys; an input pointing device adapted for inputting the text input by the pointing device being placed on a key of the keyboard corresponding to the first character of the sub-word, and then by being moved to subsequent keys corresponding to subsequent characters of the sub-word, so as to produce a trajectory pattern; a dictionary database associated with the keyboard and the pointing device, the dictionary database comprising words and associated frequencies of usage; a database management tool operatable upon the dictionary database; and a partial trajectory recognition module associated with the keyboard and the pointing device, wherein the trajectory pattern is evaluated to produce sub-word solutions; wherein the sub-word solutions are used in conjunction with the dictionary database and the database management tool to selectively recognize at least one word prediction solution corresponding to at least one long word.

BRIEF DESCRIPTION OF THE DRAWINGS

The invention is herein described, by way of example only, with reference to the accompanying drawing, wherein.

DETAILED DESCRIPTION OF PREFERRED EMBODIMENTS

Figure 1:
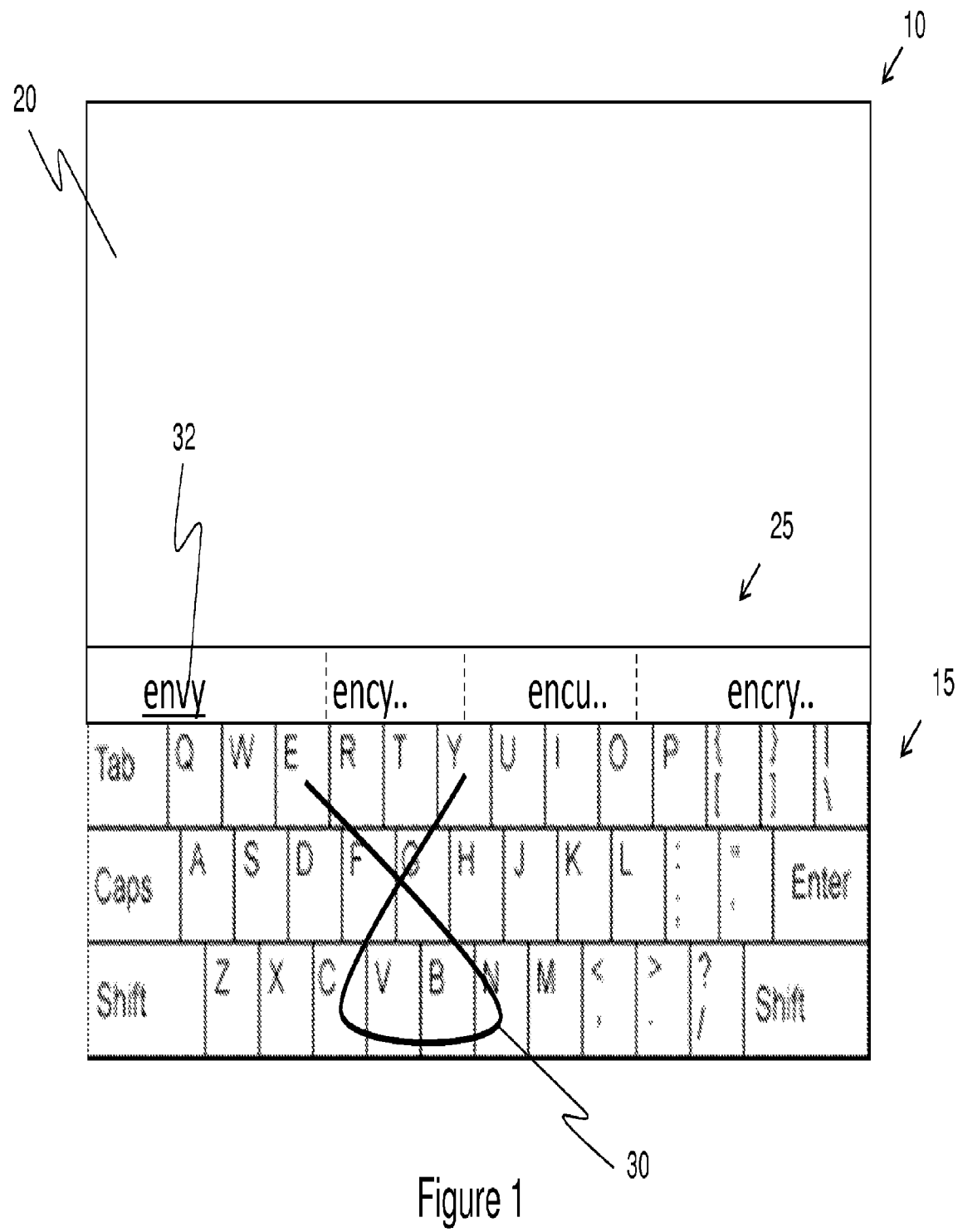
FIG. 1 is a schematic drawing of a touch screen having a virtual keyboard, an editor area, and a keyboard banner, in accordance with an embodiment of the current invention.

Embodiments of the present invention relates generally to the field of mobile and handheld electronic devices with touch screens. More specifically, embodiments of the present invention relates to a reduced keyboard, and a method associated for sliding capabilities and even more specifically to a method of recognizing a long word when input is a partial trajectory of the word.

In the specification and claims which follow, the following terms are identified and defined, in conjunction with a virtual keyboard:

"pen-up", "mouse-up", and/or "finger-up" are intended to mean, inter alia, the action representing lifting up a pen or finger or unclicking a mouse—all for the purpose of terminating a word trajectory. Similarly, "pen-down", "mouse-down", and "finger-down" are, respectively, meant to be opposite action, for the purpose, generally, of initiating or continuing a word trajectory. Finally, "pen-move", "mouse-move", and "finger-move" are, respectively, intended to mean the continuation of pen/mouse/finger movement in word tracing in a word trajectory.

"long press" is intended to mean the act of maintaining pen/mouse/finger in position, without movement, for a significant time—such as longer than approximately one second—typically when word tracing has stopped.

"partial trajectory" or "partial sliding trajectory" is intended to mean a trajectory representing part of a word.

"sub-word" is intended to mean part of the word—frequently an initial part of the word—that is being traced or tapped. A sub-word (or "sub word") is useful in disambiguating a long word, as described hereinbelow.

Embodiments described hereinbelow are related to when and how a set of predictions is generated when the input is a partial trajectory, with a set of word predictions provided to the user based on the inputted partial trajectory. Optionally or additionally, the user can start to input a word by tapping the letters and then continue the rest of the word (or part of the rest of the word) using a tracing trajectory.

To discriminate between a complete word sliding trajectory (for example, the complete word "the") and a partial trajectory (for example, when only "the" is input as part of the intended, complete word "themselves") a partial disambiguation algorithm can be operated, preferably after a long press.

Partial disambiguation and prediction can also theoretically be triggered on pen-up; but they are not straightforward/intuitive because the user in this case does not receive any information during tracing. As a result, the user cannot decide whether or not to continue tracing the trajectory. Furthermore, disambiguation at this point may not suitable because ambiguities can arise. For example, the user could sometimes receive partial word solutions when he would expect a full word, or vice versa.

A second and more preferable possibility/alternative is to enable disambiguation algorithms in a "pen-move" situation to generate a predictive set of solutions while the user is still tracing. Triggering (i.e. the action to activate the disambiguation algorithm) can take place after a long press. Alternatively or additionally, triggering can take place upon a sharp change in direction in the tracing trajectory (for example, at an inflection point of the trajectory). Other triggering options can include, but are not limited to: a counter on a certain number of points (i.e. keys) being touched and/or; after a certain time passes during tracing. The options noted hereinabove serve solely as examples, and alternative/optional ways of triggering partial word disambiguation are considered part of the scope of embodiments of the current invention.

Once the disambiguation algorithm is triggered and a set of predictions is presented to the user, he can continue to trace the trajectory; with the previous set of predictions disappearing immediately. After further tracing followed with a new long press, another set of predictions can potentially be displayed. Another possibility is for the user to finger-up, and the previously-displayed prediction set remains displayed. If no sub-word prediction set is generated after finger up, disambiguation is performed using the current trajectory as if it represented a full word. This will more clearly be explained hereinbelow.

The exemplary figures which follow illustrate how embodiments of the current invention having partial trajectories can be efficiently used to generate a set of predictions at an early stage in tracing, thus allowing faster input and limiting errors resulting from complex trajectories, which are inherent to larger words. The following figures additionally illustrate how the user can combine sliding and tapping and obtain similar results with both input methods. A discussion of the algorithms, filters, and dictionaries used in embodiments of the current invention is presented following the discussion of the illustrative figures.

Reference is currently made to FIG. 1, which is a schematic drawing of a touch screen 10 having a virtual keyboard 15, an editor area 20, and a keyboard banner 25, in accordance with an embodiment of the current invention. Touch screen 10 and its elements (namely, the keyboard, editor area, and keyboard banner) is an exemplary representation of touch screens available in wide array of hand-held and other electronic devices, as known in the art.

A tracing trajectory 30 of the partial word "ency" is shown on the keyboard. When the user has reached the last character "y" and stops tracing while maintaining a finger-down (long press), the solutions "envy", "ency . . . ", "encu . . . ", " . . . ", "encry . . . ", are displayed on keyboard banner 25. On finger up, the displayed solutions on the keyboard banner remains unchanged. This is convenient because the user always sees the same results when he lifts his finger, following a long press. As a result, he can decide to use the information he receives during the tracing process (on-the-fly suggestions) and whether or not he wants to lift his finger (when he is satisfied with the solutions) or, alternatively, if he wishes to continue tracing the word trajectory to obtain more precise predictions.

In the current figure, a leftmost (i.e., first) solution 32 "envy" is underlined or otherwise emphasized (i.e. by color and or different background). Leftmost solution 32 corresponds to the first choice disambiguated solution the user would have obtained if he fingered-up on "y" (i.e., without a long press). The others solutions shown terminating with two periods are multiple solutions and are further explained hereinbelow. Note that editor area 20 has no text, as a word solution is not displayed in the editor area during the tracing process. Note also that if at this stage there is a finger-up, the above set of solutions remains displayed.

Figure 2:
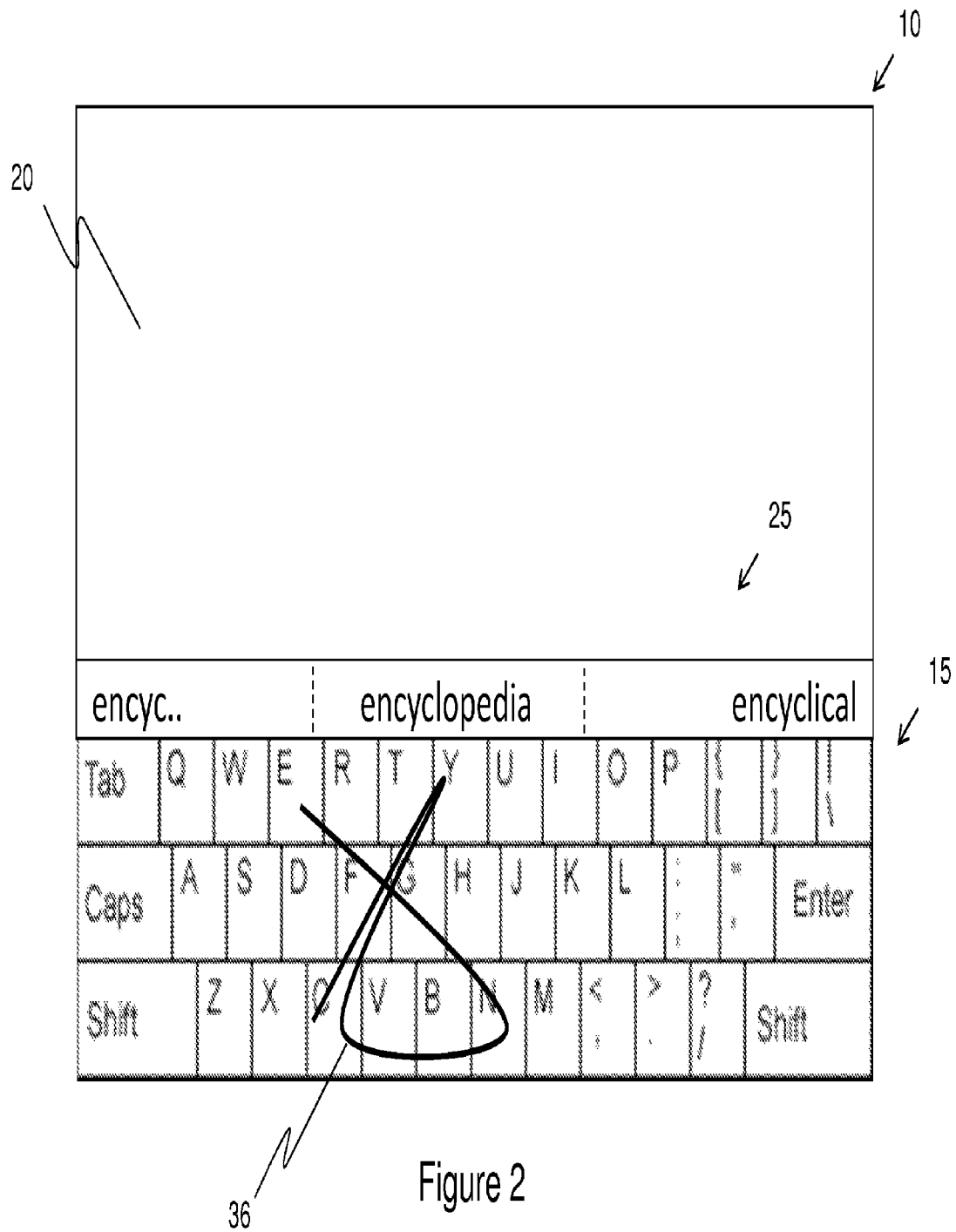
FIG. 2 is a schematic drawing of the touch screen of FIG. 1, and which further illustrates a tracing trajectory of the partial word "encyc", in accordance with an embodiment of the current invention.

Reference is now made to FIG. 2 which is a schematic drawing of the touch screen of FIG. 1, and which further illustrates a tracing trajectory 36 of the partial word "encyc", in accordance with an embodiment of the current invention. Apart from differences described below, touch screen 10 is identical in notation, configuration, and functionality to that shown in FIG. 1, and elements indicated by the same reference numerals and/or letters are generally identical in configuration, operation, and functionality as described hereinabove.

Tracing trajectory 36 terminates at character "c" and the user stops with a long press. Solutions: "encyc . . . "; "encyclopedia"; "encyclical" are displayed on keyboard banner 25. The solutions are displayed as long as the long press situation is maintained. However the solutions disappear with finger-move. In this specific example, there is only one solution terminating with two periods, namely "encyc . . . " which is the only partial solution found. The other solutions provided are full words starting with the common characters "encyc".

In this case, the characters "encyc" represent a sub-word of the word "encyclopedia". In embodiments of the current invention, a sub-word is typically displayed on keyboard banner 25 followed by two periods, such as "encyc . . . " or on editor area 20, as described further hereinbelow.

Figure 3:
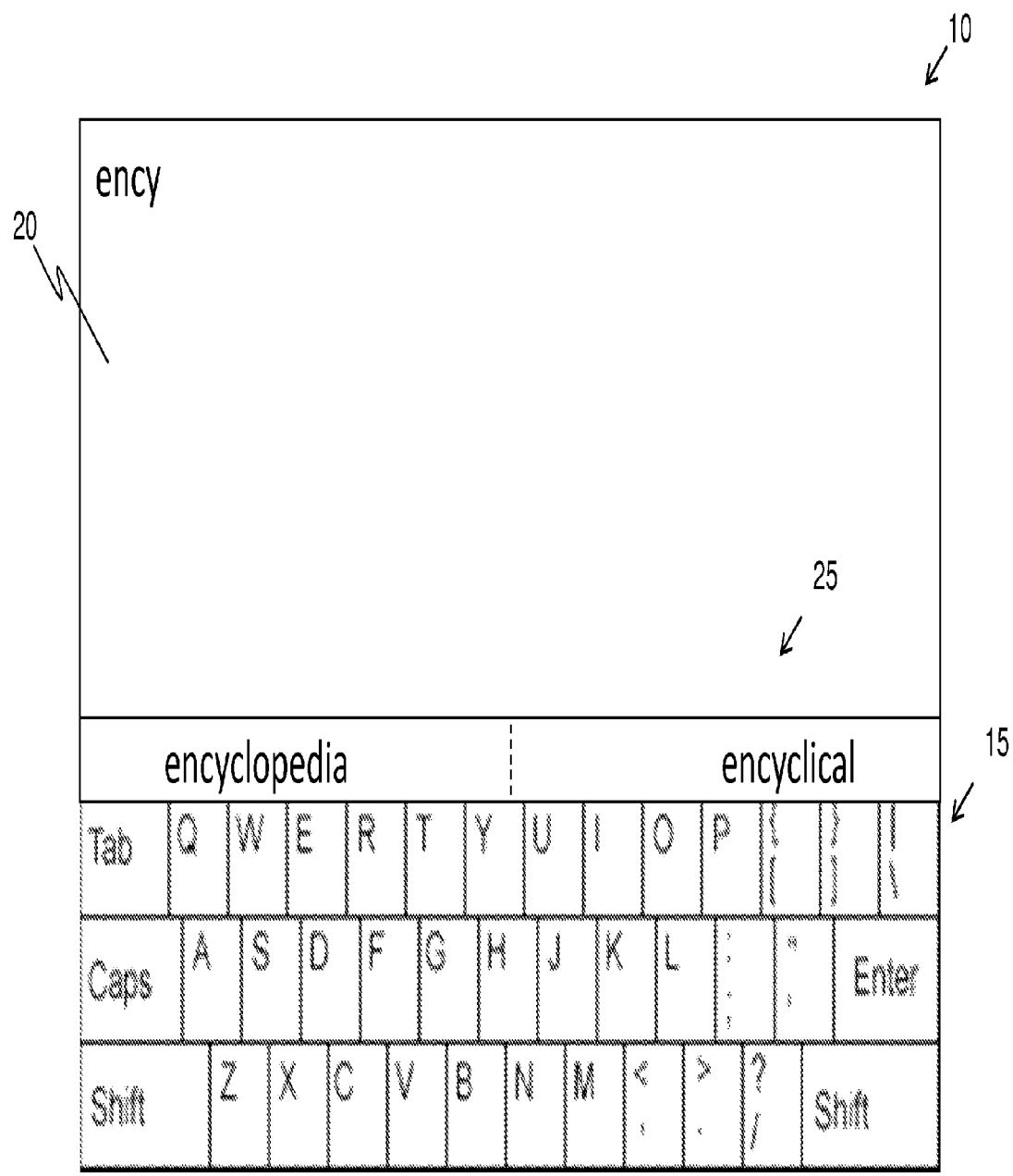
FIG. 3 is a schematic drawing of the touch screen of FIG. 2, and in which the user has pressed on the solution "ency . . . " in accordance with an embodiment of the current invention.

Reference is currently made to FIG. 3, which is a schematic drawing of touch screen 10 of FIG. 1, and in which the user has pressed on the solution "ency . . . ", in accordance with an embodiment of the current invention. Apart from differences described below, touch screen 10 is identical in notation, configuration, and functionality to that shown in FIG. 1, and elements indicated by the same reference numerals and/or letters are generally identical in configuration, operation, and functionality as described hereinabove. In FIG. 3 sub-word "ency" is displayed on editor area 20 and full solutions "encyclopedia" and "encyclical" are displayed on keyboard banner 25. At this point, the sub-word displayed on the editor area and full solutions displayed on the keyboard banner are equivalent to those obtained had the four characters: "e"+"n"+"c"+"y" been tapped and not traced. In other words, both tapping and tracing would have yielded the same solutions.

Figure 4:
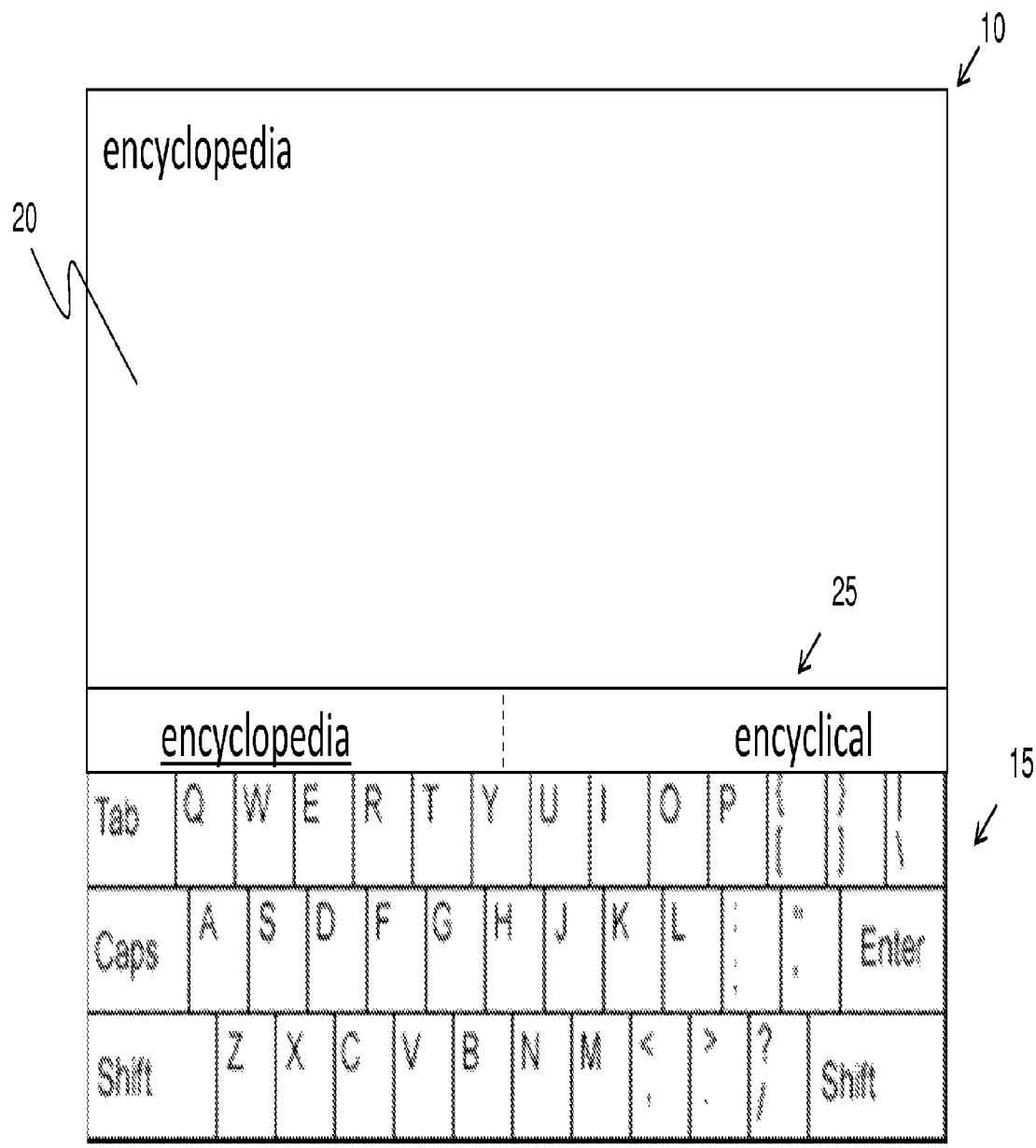
FIG. 4 is a schematic drawing of the touch screen of FIG. 3, in accordance with an embodiment of the current invention.

Reference is currently made to FIG. 4, which is a schematic drawing of touch screen 10 of FIG. 3, in accordance with an embodiment of the current invention. Apart from differences described below, touch screen 10 is identical in notation, configuration, and functionality to that shown in FIG. 3, and elements indicated by the same reference numerals and/or letters are generally identical in configuration, operation, and functionality as described hereinabove. When the user presses prediction "encyclopedia" (displayed on keyboard banner 25, as shown in FIG. 3) the selected word "encyclopedia" is emphasized (i.e. underline and/or other emphasis) on keyboard banner 25 and also appears in the editor area—all as seen in FIG. 4.

FIGS. 1-4 illustrate the efficacy of partial trajectories in that the user does not need to trace the entire trajectory of the word "encyclopedia". Instead, he needs only to start the trajectory and then to pause for a short time and see whether the solution he has in mind is partially or fully displayed on the prediction set. Based on the situation, he can decide to finger up and then choose a prediction solution from the suggestions in the keyboard banner, or he can continue the sub-word by tapping or by keeping his finger in position and continuing the sliding trajectory to obtain a more updated set of predictions. The alternatives noted above are illustrated in the figures which follow hereinbelow.

Figure 5:
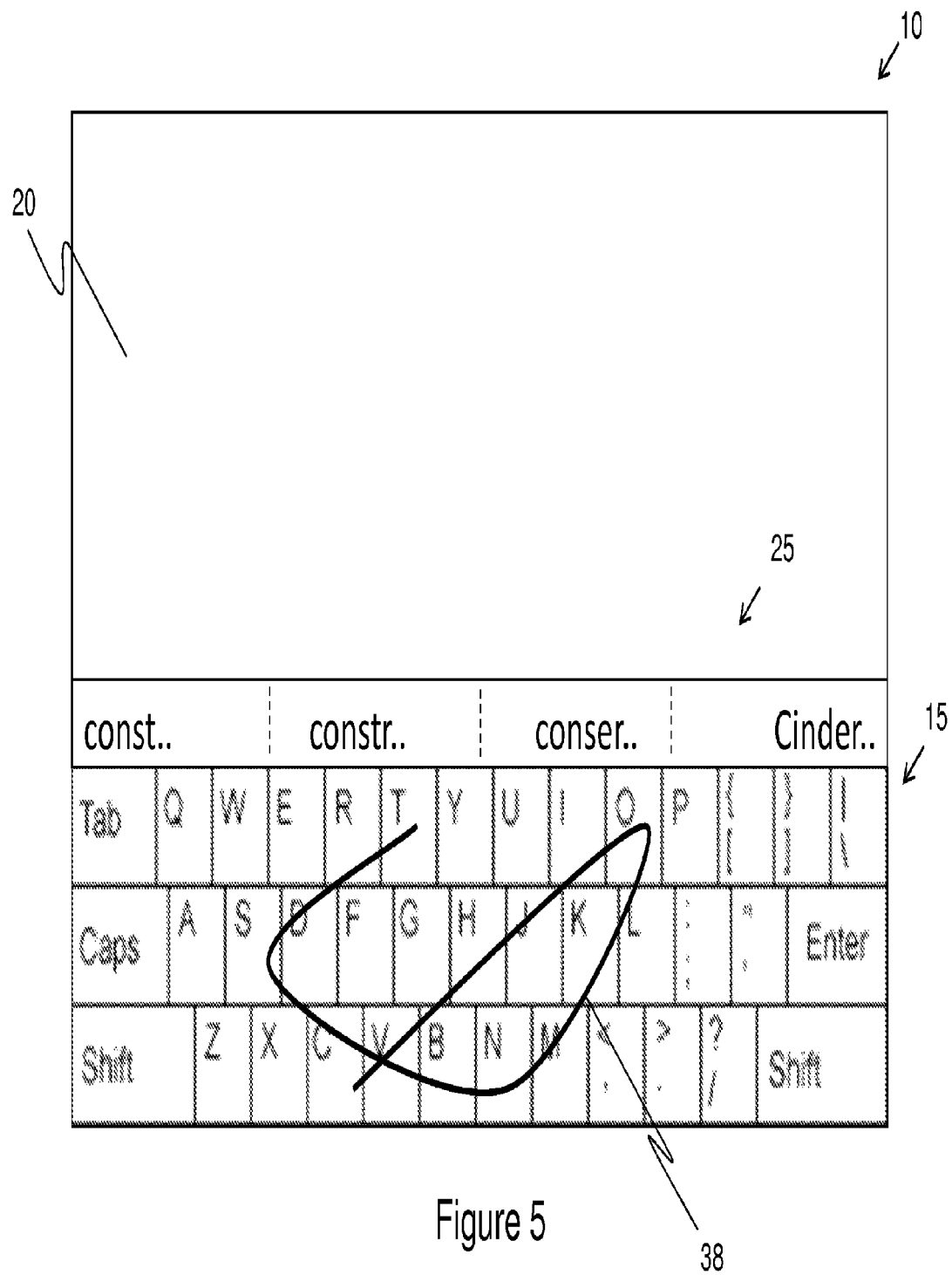
FIG. 5 is a schematic drawing of the touch screen of FIG. 1, in which a tracing of the partial word "const" has been made, in accordance with an embodiment of the current invention.

Reference is currently made to FIG. 5, which is a schematic drawing of touch screen 10 of FIG. 1, in which a tracing 38 of the partial word "const" has been made, in accordance with an embodiment of the current invention. Apart from differences described below, touch screen 10 is identical in notation, configuration, and functionality to that shown in FIG. 1, and elements indicated by the same reference numerals and/or letters are generally identical in configuration, operation, and functionality as described hereinabove. When the user makes a short pause at the letter "t" (the last letter of "const") he obtains a set of partial predictions shown in keyboard banner 25: "const . . . "; "constr . . . "; "conser . . . "; and "Cinder . . . ". Each of the four solutions shown in the figure corresponds to a full set of word predictions. For example, word solutions to the partial predication "conser . . . " include the words: "conservation, conservations,", etc.

Figure 6:
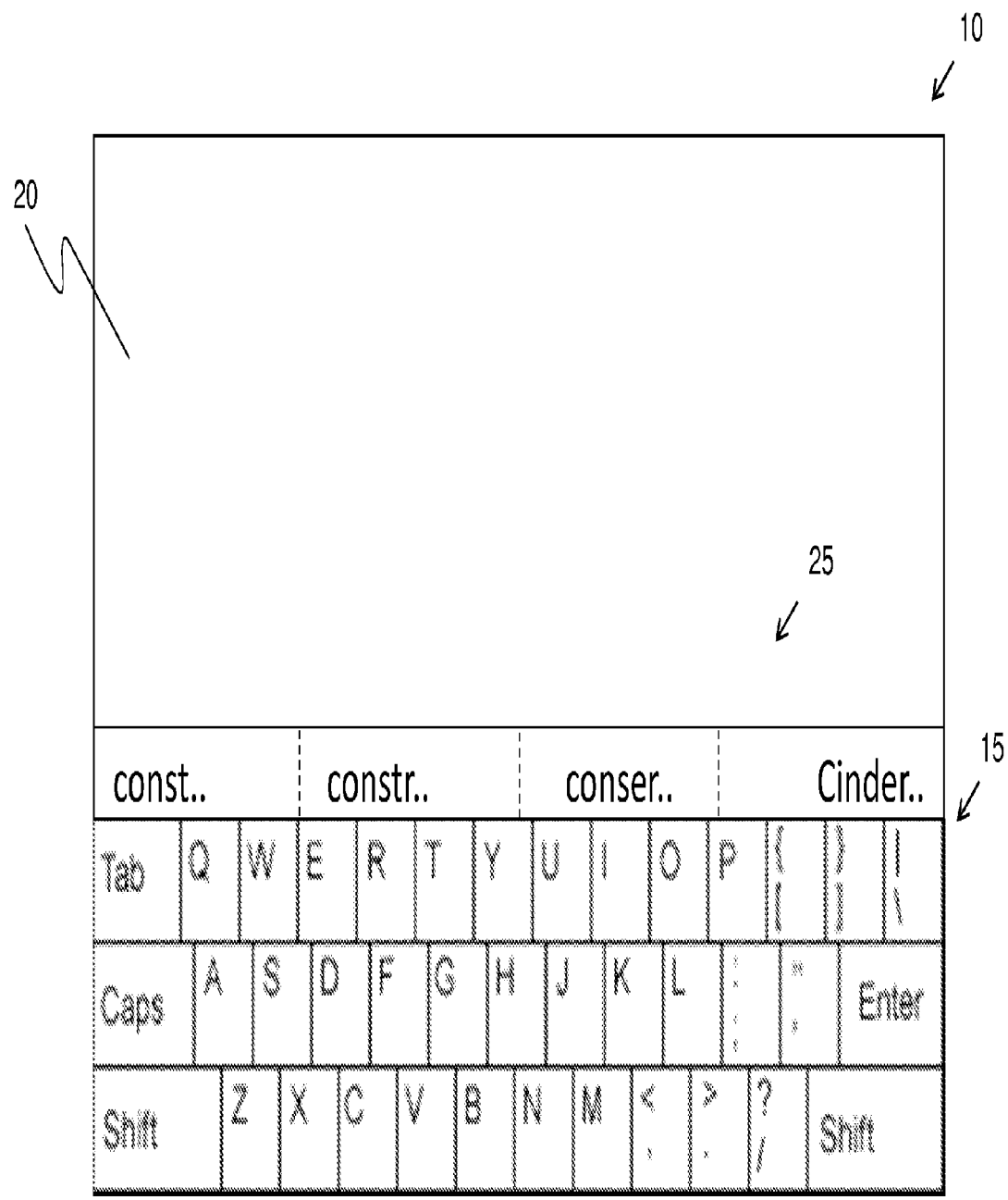
FIGS. 6 to 9 are schematic drawings of the touch screen of FIG. 5, in which the user has in mind the word "constitution", in accordance with an embodiment of the current invention.
Figure 7:
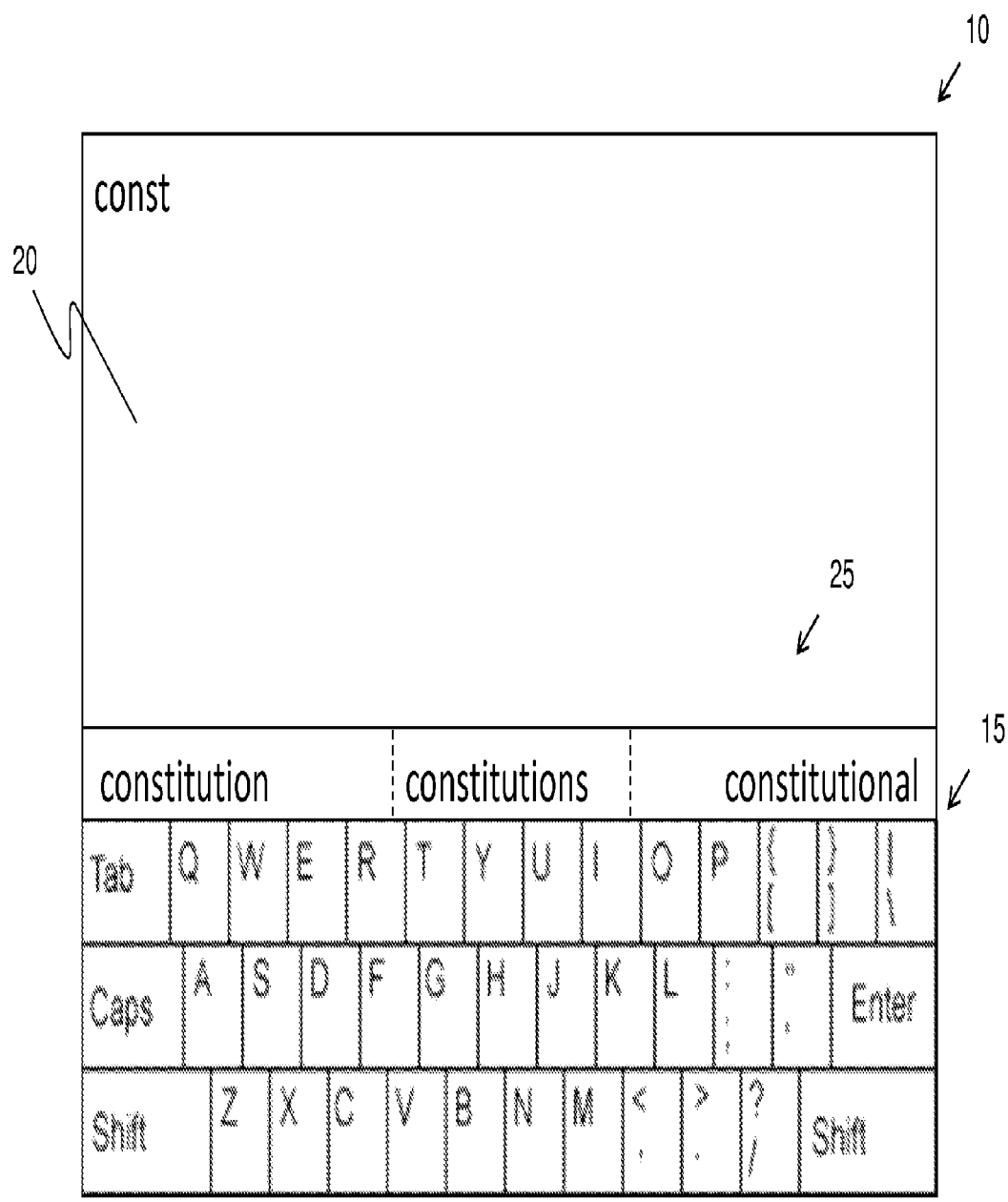

Reference is currently made to FIGS. 6 to 9, which are schematic drawings of touch screen 10 of FIG. 5, in which the user has in mind the word "constitution", in accordance with an embodiment of the current invention. Apart from differences described below, touch screen 10 is identical in notation, configuration, and functionality to that shown in FIG. 5, and elements indicated by the same reference numerals and/or letters are generally identical in configuration, operation, and functionality as described hereinabove. In FIG. 6 the user presses sub-word "const . . . " in keyboard banner 25. In FIG. 7, after the user fingers up from the choice of "const . . . ", a set of predictions corresponding to the previous pressed solution "const . . . " is displayed in keyboard banner 25, namely: "constitution"; "constitutions"; and "constitutional". The sub-word "const" is displayed in editor area 20.

Figure 8:
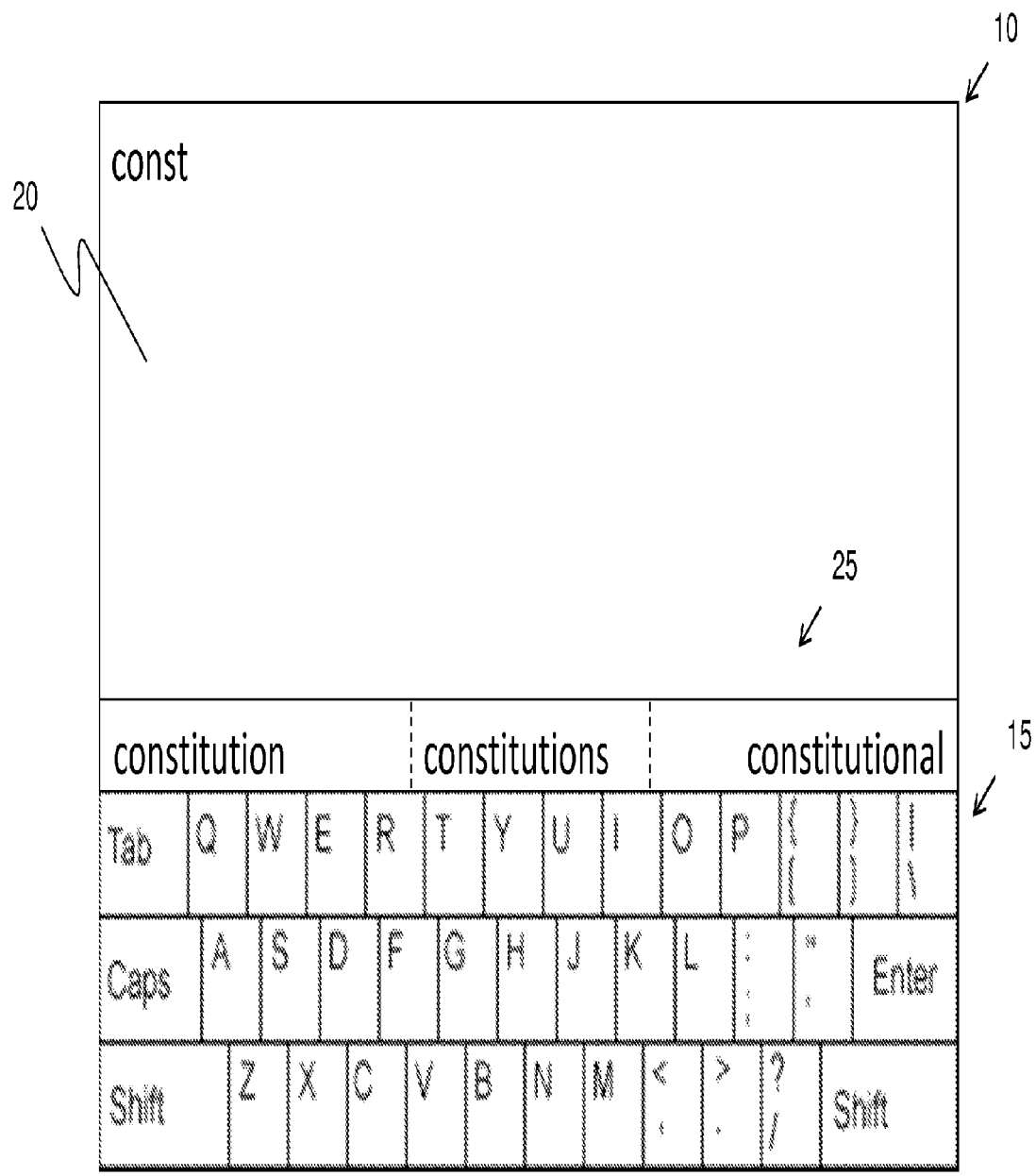
Figure 9:
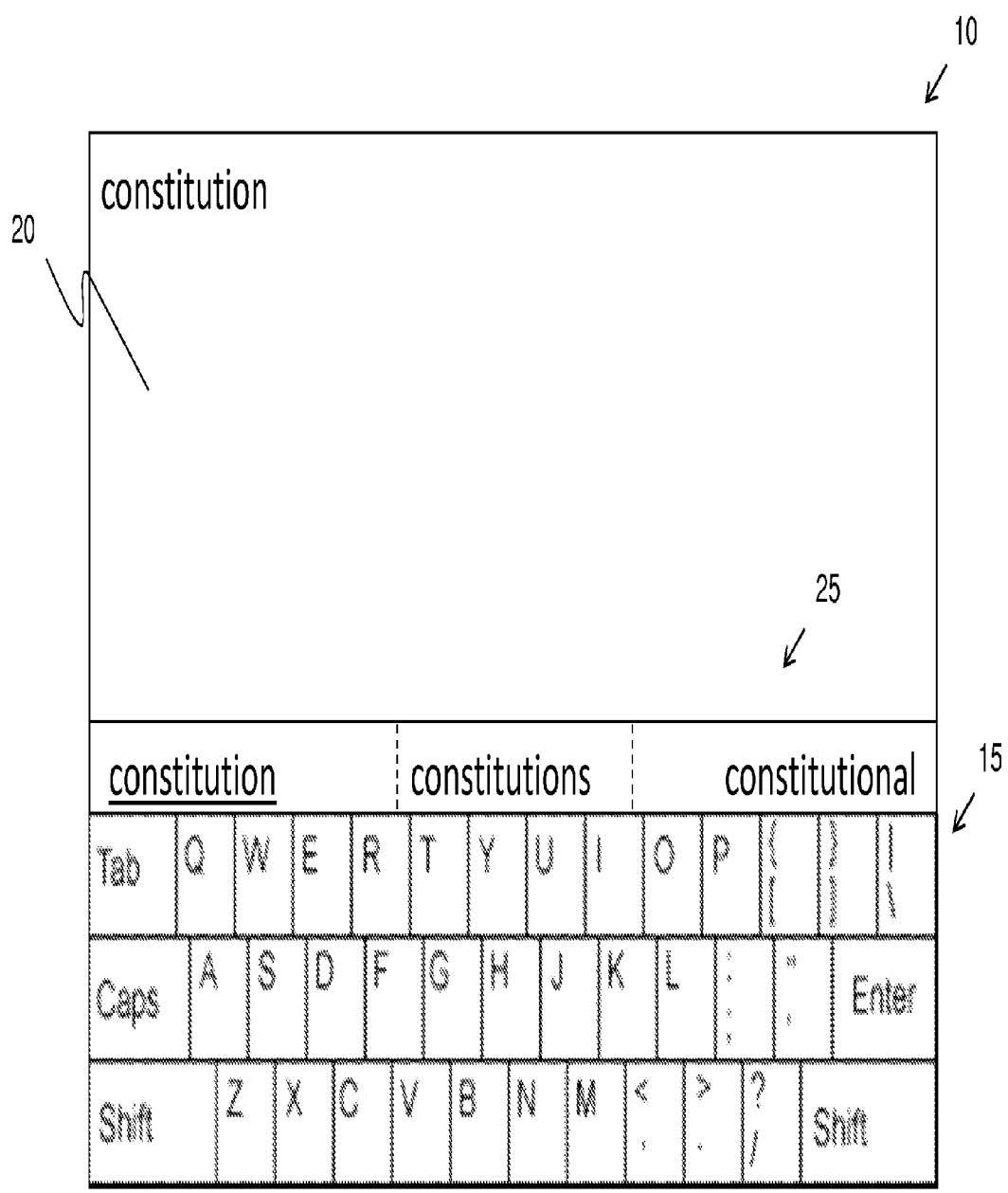

In FIG. 8, the solution "constitution" is chosen (by finger press, mouse click, etc.). In FIG. 9, following finger up, the selected word "constitution" becomes emphasized on keyboard banner 25, replacing the sub-word "const" previously displayed on editor area 20 (refer to FIG. 8). In this manner, the word "constitution" is displayed on the editor area, starting with a partial trajectory as shown in FIG. 5 and then, through the use of sub-words, a final choice is made in FIG. 9. Another method of arriving at the same solution is illustrated hereinbelow.

Figure 10:
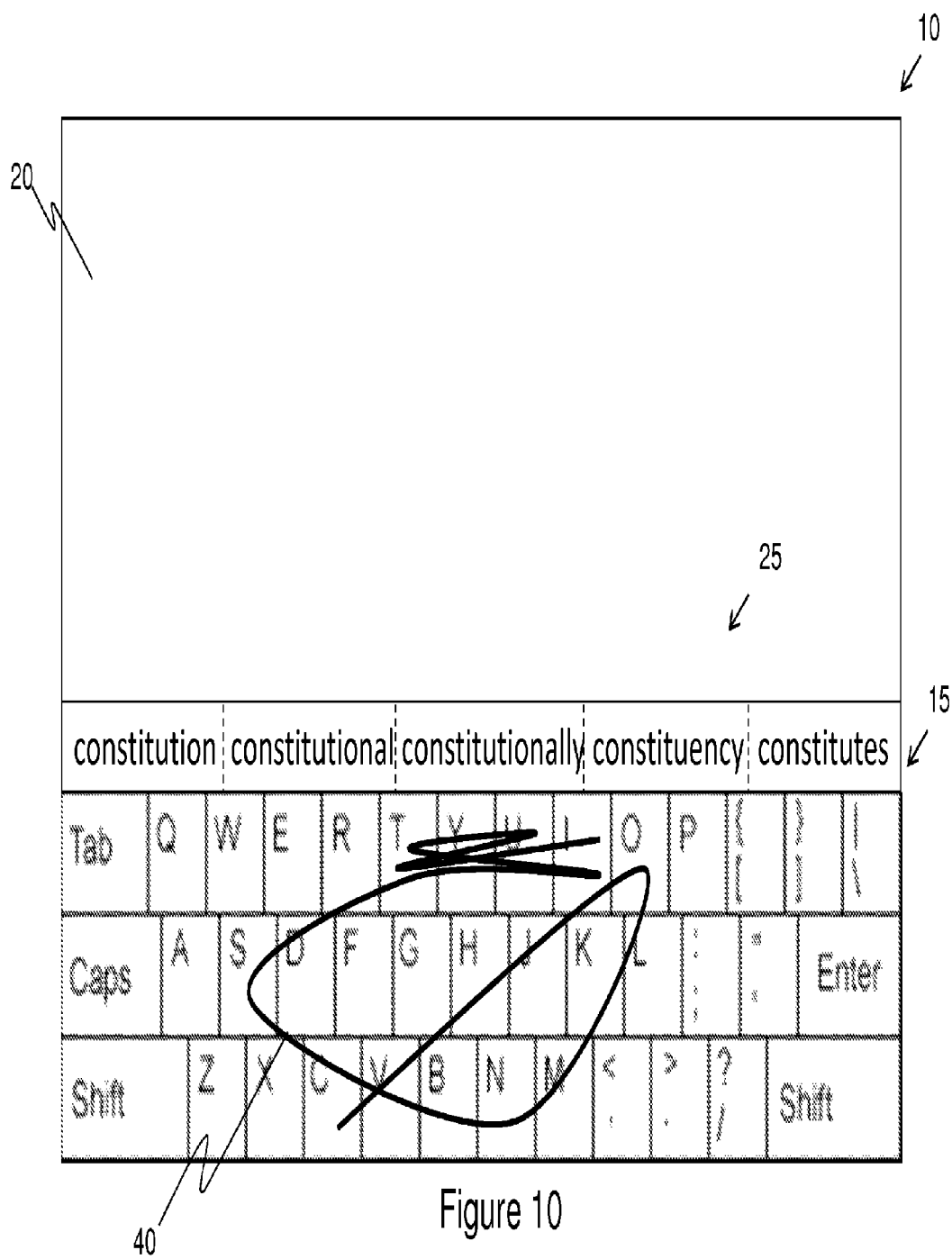
FIG. 10 is a schematic drawing of the touch screen of FIG. 5, in which the user proceeds with the sliding trajectory shown, in accordance with an embodiment of the current invention.

Reference is currently made to FIG. 10, which is a schematic drawing of touch screen 10 of FIG. 5, in which the user proceeds with the sliding trajectory shown, in accordance with an embodiment of the current invention. Apart from differences described below, touch screen 10 is identical in notation, configuration, and functionality to that shown in FIG. 5, and elements indicated by the same reference numerals and/or letters are generally identical in configuration, operation, and functionality as described hereinabove. The user after the long press done in FIG. 5 on the letter "t" continues to complete a trajectory 40 (in the present figure) yielding "constituti", whereupon he makes a short pause on the last character "i". A set of predictions is displayed on keyboard banner 25, namely: "constitution"; "constitutional"; "constitutionally"; "constituency; and "constitutes".

At this point, the desired word "constitution" may be chosen. Similar examples of tracing-and-solution follow hereinbelow.

Figure 11:
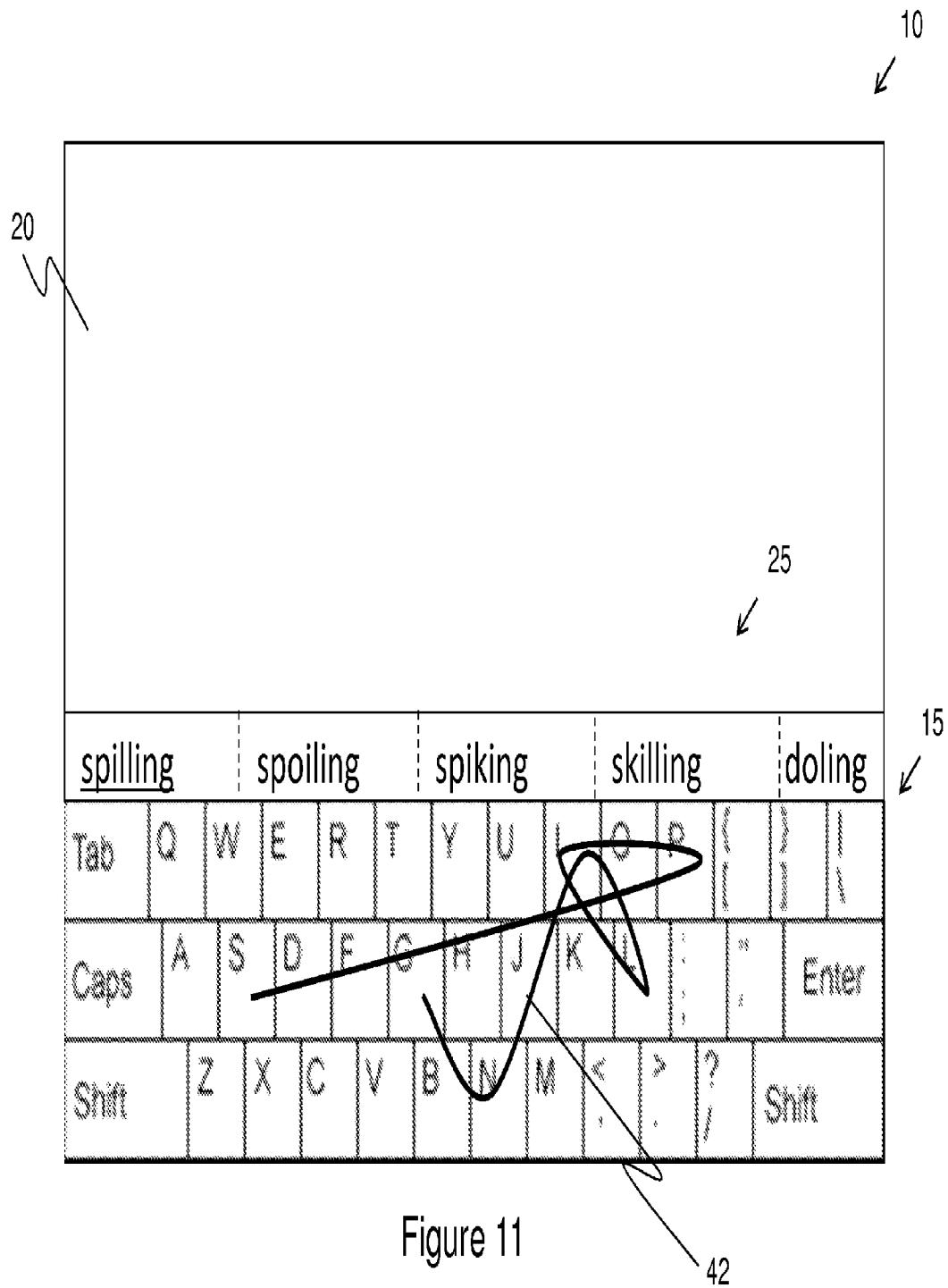
FIGS. 11 to 13 are schematic drawings of the touch screen of FIG. 1, and in which input variations are shown, in accordance with an embodiment of the current invention.
Figure 12:
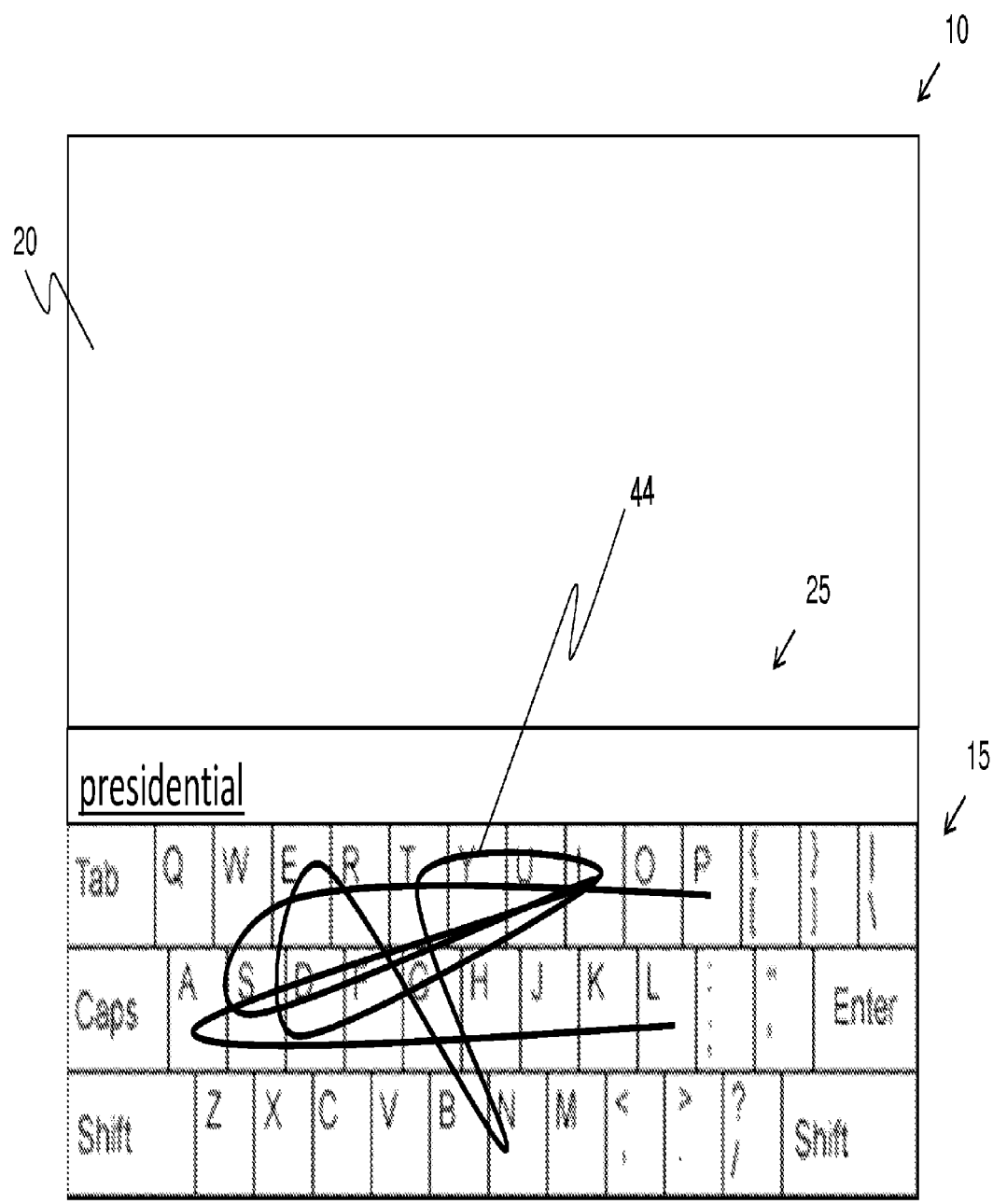
Figure 13:
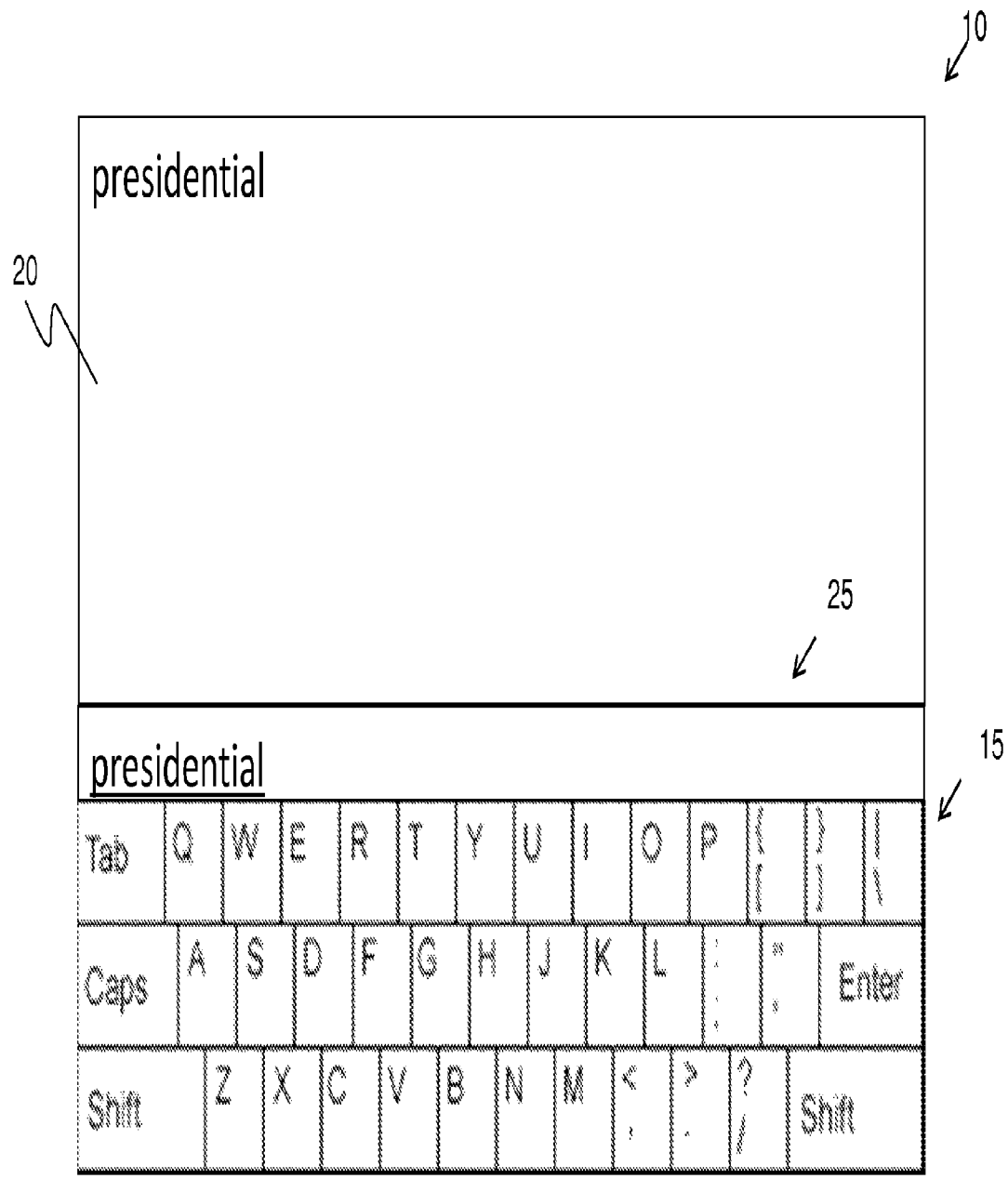

Reference is currently made to FIGS. 11 to 13, which are schematic drawings of touch screen 10 of FIG. 1, in accordance with an embodiment of the current invention. Apart from differences described below, touch screen 10 is identical in notation, configuration, and functionality to that shown in FIG. 1, and elements indicated by the same reference numerals and/or letters are generally identical in configuration, operation, and functionality as described hereinabove. In FIG. 11 a tracing 42 of the word "spilling" is completed, followed by a long press on the last character "g" of tracing 42. The solution set shown in the keyboard banner includes full disambiguated solutions only (and not sub words) corresponding to trajectory 42. The first (and most appropriate) solution word, "spilling", is displayed with emphasis, in keyboard banner 25 along with other solutions: "spoiling"; "spiking"; "skilling"; and "doling", since in this case there are no sub-words prediction to display.

In FIG. 12 a tracing 44 of the word "presidential" is completed, followed by a long press on the last character "l" of the tracing. The result in FIG. 12 is very similar to that shown in FIG. 11 in which only complete words were displayed in the keyboard banner. In the current figure, however, only a single disambiguated solution: "presidential" is displayed in keyboard banner 25.

In FIG. 13 the user has just fingered up from tracing 44, as shown in FIG. 12. The word "presidential" is displayed in editor area 20. This scenario is the only situation in which a word is directly displayed on the editor when the finger is lifted after a tracing followed with a long press.

Figure 14:
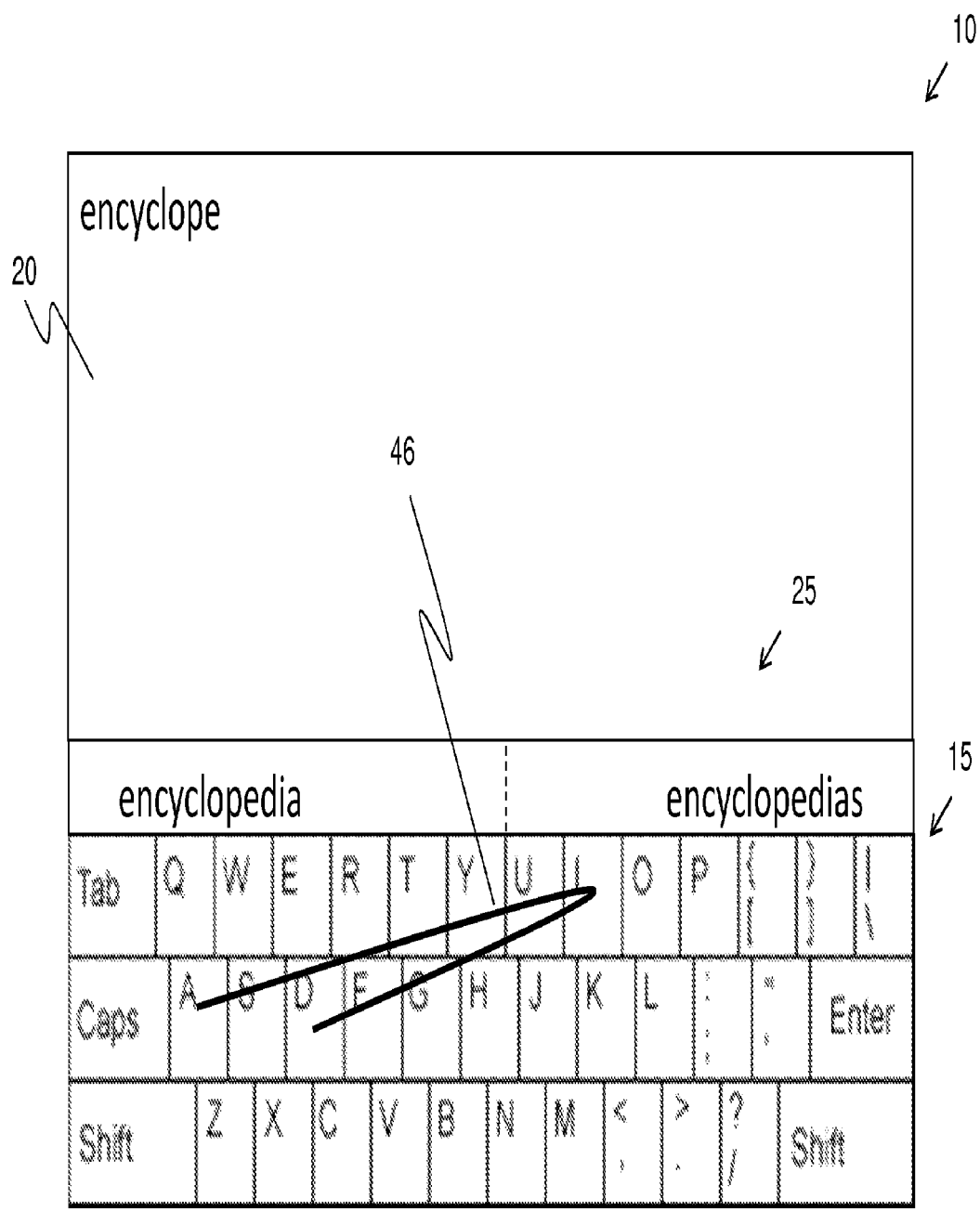
FIGS. 14 and 15 are schematic drawings of the touch screen of FIG. 1, in which tapping and tracing are combined, in accordance with an embodiment of the current invention.
Figure 15:
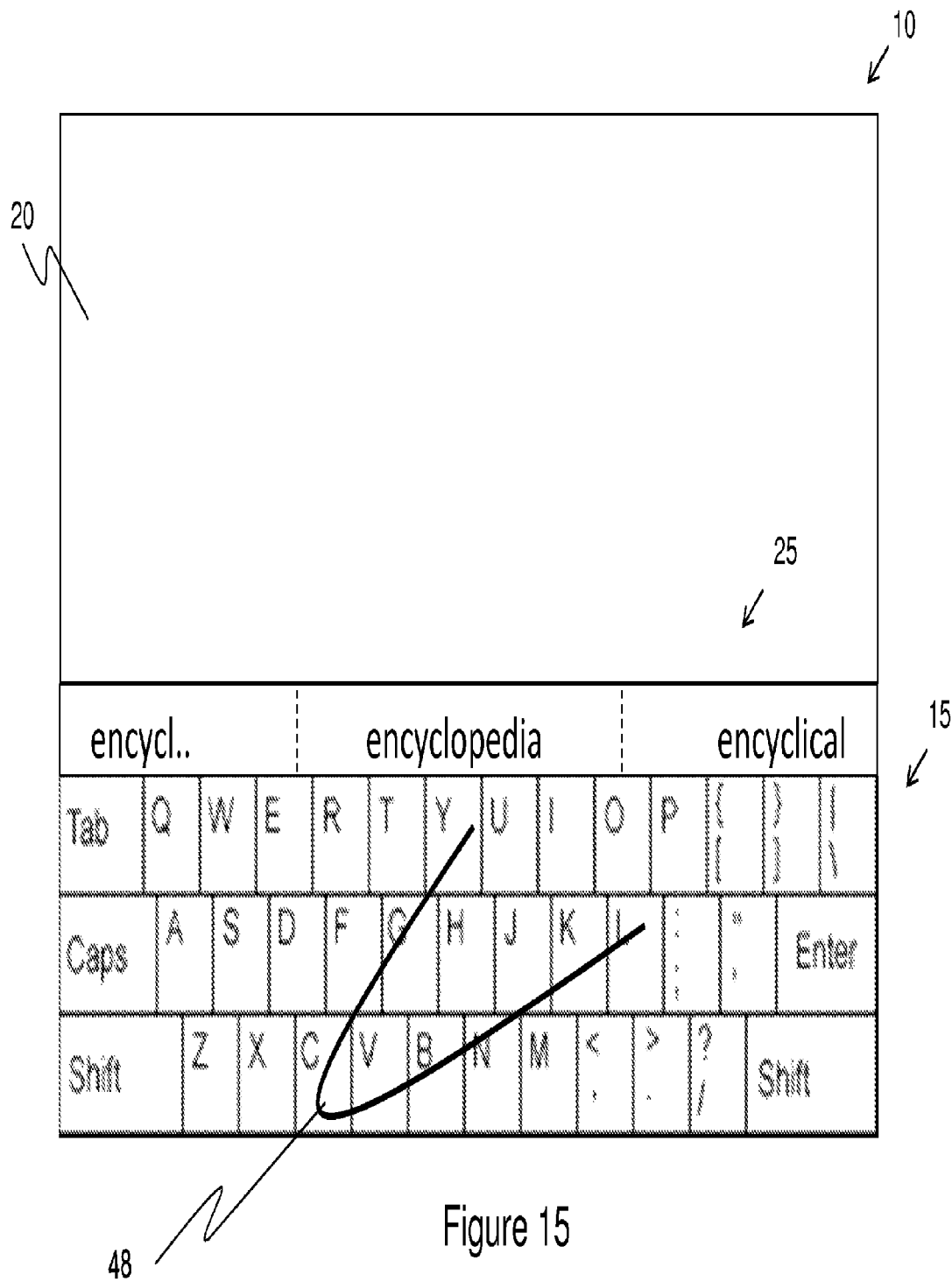

Reference is currently made to FIGS. 14 and 15, which are schematic drawings of touch screen 10 of FIG. 1, in which tapping and tracing are combined, in accordance with an embodiment of the current invention. Apart from differences described below, touch screen 10 is identical in notation, configuration, and functionality to that shown in FIG. 1, and elements indicated by the same reference numerals and/or letters are generally identical in configuration, operation, and functionality as described hereinabove. In FIG. 14, the user has tapped sub-word "encyclope", shown in editor area 20 by tapping the keys: "e"; "n"; "c"; "y"; "c"; "l"; "o"; "p"; and "e" and fingers up after tapping "e". He then places his finger, making a long press on the letter "d"; continues to trace a sub trajectory 46, starting from letter "i" to letter "a"; and then fingers up, thus creating the partial tracing trajectory "dia". A trajectory combining the ideal trajectory of the tapped sub-word "encyclope" with the user partial tracing trajectory "dia" is sent to the disambiguation process, and it is treated the same way as the full trajectory corresponding to the long word "encyclopedia".

Solutions "encyclopedia" and "encyclopedias" are displayed on keyboard banner 25. The solutions are equivalent to a full trajectory input of the word "encyclopedia". In this case, sub-trajectory 46 is not interpreted as a new word because it followed the long pause on the letter "d" after the previously-tapped letters. In the current example, the equivalent trajectory used for disambiguation is composed of the tapped keys "encyclope" and sub-trajectory 46 "dia", yielding the keys (and full solution) "encyclopedia".

Another example of input and disambiguation is illustrated in FIG. 15. The user has tapped the sub-word "enc", namely: "e"; "n"; and "c". "Enc" was displayed on the editor area (not shown in the current figure). The user then places his finger, making a significant pause on the letter "y" location and traces a trajectory 48 comprising "ycl", stopping on the letter "l" with a long press. Solutions "encycl...", "encyclopedia" and "encyclical" are displayed on keyboard banner 25 (and the previously displayed sub-word "enc" is erased from the editor area).

In the current example, the equivalent trajectory used for disambiguation is composed of the tapped keys "enc" and sub-trajectory 48 "ycl", yielding the characters "encycl"—which in this case is sufficient to allow a complete prediction of the solution "encyclopedia".

It is seen that the user can alternate between tapping and tracing for the same word as many times he wants, using the long press features as described hereinabove. It may be appreciated that the feature described hereinabove is intuitive and is effective. If the user obtains a set of predictions in a pen-move situation he has the option to continue a trajectory to obtain a more detailed and new set of predictions. Alternatively or optionally, he can finger up and terminate input for the word by tapping or he may interrupt his tapping to choose a displayed prediction/solution.

"Dictionary Database"

Suraqui, in '786 describes a dictionary database, which comprises of n_class*n_class classes, corresponding to the first and last character of the sliding trajectory word. In English, for example, n_class=26.

The '786 dictionary database comprises a plurality of classes containing words that have first and last letters corresponding to predetermined keys of the keyboard. For keyboards in which each key corresponds to one letter (for example, the QWERTY keyboard), a class may be, for example, class d-h. (This exemplary class would include all words starting with the letter d and ending with letter h). As an example, in the English language, the total number of classes is 26*26=676. In Arabic it is 35*35=1225. In '786, Suraqui also describes a keyboard in which each key has a plurality of letters. It is appreciated that embodiments of the current invention are likewise adapted to this kind of input/keyboard.

In the specification and claims which follow, the term "Dictionary database" (or alternatively "Dictionary") is intended to mean the '786 dictionary database as well as any other dictionary having words with associated frequencies of usage, irrespective of word arrangement.

The process of generating a set of prediction solutions during tracing is generally a three-step procedure. The first step in one embodiment of the current invention is to create a long word dictionary, LWD. The second step is detection and selection of candidate sub-words corresponding to a partial trajectory. The last step is to generate a set of full word predictions from the above sub-words.

Long Word Dictionary (LWD)

In the specification and claims which follow, the term "Long Word Dictionary" (LWD) is intended to be a dictionary used by a sub-word filtering module as described hereinbelow. The long word dictionary is generated from the Dictionary database and comprises long words and their respective frequencies of usage.

There is no need to change the existing working dictionary database. The user may set values of parameters for the size of the long word dictionary. Two main parameters related to the size of the LWD are Max_Let and Min_Freq.

The long word dictionary is composed of all the words having a number of characters greater or equal to Max_Let (default value=8 in English) and a frequency greater or equal to Min_Freq (default=100). Using the default parameter values, this means that all words of the LWD have at least 8 letters and a frequency of use greater or equal to 100. As an example using the English dictionary and the above default values the magnitude of the newly created LWD is 15,382 words totaling 148, 691 characters. Additionally or alternatively, other parameters and/or rules may be used to limit and/or define the size of the LWD (i.e. the total number of long words) such as, but not limited to: words NOT as proper names; only words as proper names; or other limitations to the type of subject of the words.

The LWD is generated in real time from the dictionary database. All the classes of the dictionary database are scanned, and all words having a number of characters greater or equal to Max_Let and a frequency greater or equal to Min_Freq will be selected. Besides the 2 above parameters other parameters could be introduced depending on the user requests for instance select only long words having a given specificity such as historical, biological, etc. The long word dictionary is composed of n_class according a word first letter and words of a given class (i.e. all words starting with the same letter) are sorted according the QWERTY order. The rationale for QWERTY sorting is described hereinbelow.

The LWD structure, as described hereinabove, is independent of the working language. The number of classes depends of the working language and sorting is according to the arrangement of the letters on the keyboard of the working language—whether the arrangement is QWERTY or any other keyboard arrangement known in the art. Other exemplary keyboard arrangements, corresponding to respective languages that can be readily adapted to embodiments of the current invention include, but are not limited to: Dvorak (English); Colemak; AZERTY (French) and Svorak (Swedish).

In another embodiment of the current invention, the LWD is not used and long word information can be extracted directly from the Dictionary database (DB) where indexation is the words column. Using a public domain database tool such as, but not limited to, SQLITE, it is easy to find all words starting with a given first letter and containing a given intermediate letter.

An example is when the first and last letters of a partial trajectory are "c" and "t", respectively. The SQLITE command to get all the words starting with "c" and having an intermediate letter "t" alphabetically sorted is:

select word from DB where word like 'c%t%' order by word

This database treatment using a database tool is as fast as the LWD embodiment of the current invention described hereinabove, and using the database tool has the advantage of obviating the step of LWD creation. Additional description of the embodiment of the current invention utilizing the database management tool follows hereinbelow.

Selection of Sub-Word Candidates

The structure of a Disambiguation Module in embodiments of the current invention is comparable to that mentioned in '786 which disclose a disambiguation process when the input corresponds to a full word trajectory. In '786, all the classes having first and last letters corresponding to possible candidates are scanned. A filtering process mainly based on trajectory length and inflection points, eliminates most of the word candidates. Next, a pattern recognition algorithm is activated to sort the most likely words, taking into account the matching distance between the input pattern and the ideal candidate word trajectory as well as the frequency of use of the candidate word.

In embodiments of the current invention in which word input is partial, i.e. sub-word, the LWD is operated upon instead of the Dictionary. As mentioned above, the long word dictionary is composed of n_class classes, arranged according to the exemplary QWERTY order. In the case of the sub-word disambiguation, the last character of the full word is initially unknown. Therefore, sub-word recognition implies that all the classes of the LWD starting with a suitable candidate letter are scanned in real time.

As an example, considering the input sub-word trajectory corresponding to the word "ency", suitable candidates for the first letter can be: "e"; "w"; "r"; and sometimes "d". (These are the 4 "nearest" keys to the key "e" on a QWERTY layout) In the example "ency" the last letter is "y", which can similarly be interpreted as: "t"; "u"; and sometimes "h". The last letter of a partial trajectory is, by definition, an intermediate letter of the prediction solution long word of the selected classes of the long word dictionary and it is used as a first filter. Therefore all the prediction solution word candidates which do not contain the identified intermediate letter are eliminated from consideration.

The next filter used compares input trajectory length with a length of a sub-word candidate which is generated from the sub-word. Note that when a long word has an intermediate character which can be in more than one location in the word, the chosen sub-word is the one having the best match with the input partial trajectory length. For instance if the user traces the sub-word "eradi" and long presses the last character "i"; and supposing that a candidate long word is "eradication"; then the generated lengths of sub-words "eradi" and "eradicati" are compared with the input pattern trajectory length and the sub-word "eradi" will likely be the one selected.

The third filter is based on inflection points, as described in '786. For instance the input "ency" has two inflection points corresponding to characters "n" "c" and their respective neighbors. All the word candidates which do not contain as intermediate letters those two letters (or their respective neighbors) in the correct order are eliminated.

An example of the sub-word selection process, using the above "ency" example, the first filter scans only 3 LWD classes starting with letters "e" or "w" or "r". The second filter serves to eliminate all long words which do not include an intermediate letters "y" or "t" or "u. Finally the last filter serves to select only the sub-words having letters "n" (and neighbors) and "c" (and neighbors) as intermediate letters.

After the above selection process is completed, only two sub-words remain, namely "ency" with frequency 138 (corresponding to the full word "encyclopedia") and "encou" with frequency 61233 (corresponding to the full word "encourage"). The two solutions are then cross-correlated with the input pattern, using the pattern recognition algorithm described in '786. Solution "encou" is eliminated because its matching distance is beyond a given threshold. Therefore, the only remaining solution is "ency". This solution is sent to the Generate Prediction Module (described hereinbelow), which serves to extract the long word solutions "encyclopedia" and "encyclical" as shown hereinabove in FIG. 3.

Another important aspect of the abovementioned algorithm is that it takes advantage of the order arrangement within each class of the LWD. When a partial trajectory is inputted all the sub-words corresponding to the user's input are generated. Given a sub-word, the algorithm looks for all the words from the LWD which start with the sub-word.

Once a long word is detected (i.e. a prediction solution word starting with the sub-word characters is identified) subsequent prediction solution words are examined. This check stops when a long word (i.e. its first letters) does not match the given sub-word. If the LWD classes were not already sorted, this process would be time consuming, because the algorithm would have needed to scan all the words of the class.

As an example, if the generated sub-word is "excl", the list of the LWD words corresponding to this sub-word is

| WORD | Frequency |
| --- | --- |
| exclusion | 2154 |
| exclusions | 277 |
| exclusive | 3123 |
| exclusively | 2615 |
| exclusivity | 185 |
| excludes | 600 |
| excluded | 2231 |
| excluding | 1015 |
| exclaimed | 1385 |
| exclamation | 292 |
| exclamations | 108 |
| ecumenical | 477 |

The first word of the list is "exclusion" and the last one is "exclamations", because the word following "exclamations" is "ecumenical"—which does not start with sub-word "excl". Frequency 3123 is attributed to the sub-word "excl" because it is the maximum frequency of the above long word list.

Figure 16:
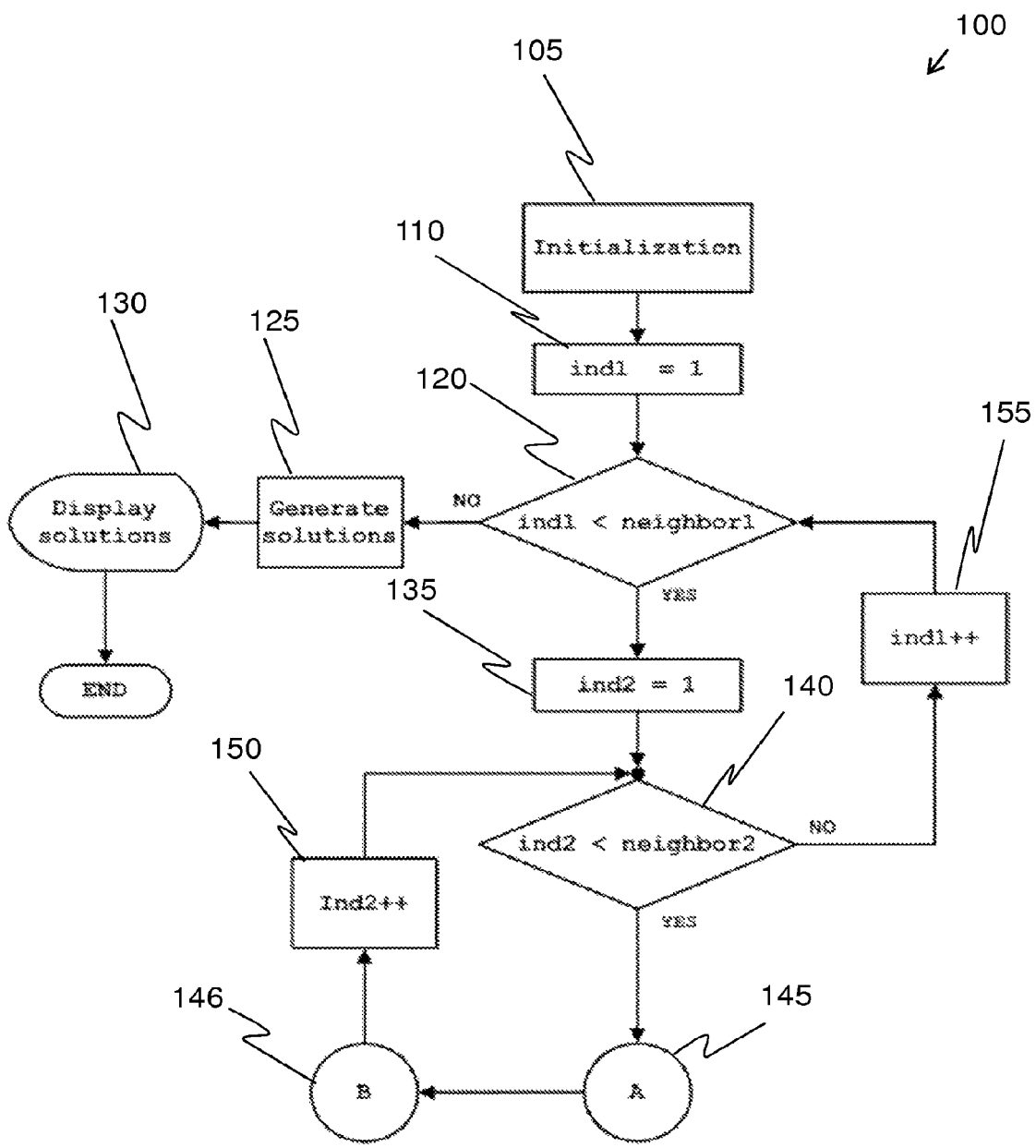
FIG. 16 is a flow chart showing the steps of partial trajectory recognition and prediction, in accordance with an embodiment of the current invention.

Reference is presently made to FIG. 16, which is a general flow chart showing the steps for partial trajectory recognition and prediction 100, in accordance with an embodiment of the current invention. The steps of partial trajectory recognition and prediction 100 are collectively referred to as the partial trajectory recognition and prediction module".

Following Step 105, Initialization, an index variable ind1 is set to value 1 in Step 110, "ind1=1". Ind1 is a variable integer number corresponding to the first letter of the sub-word. Neighbor1 is an integer number, generally equal to 4, which corresponds to the number of candidates as far as a first letter of a sub-word is concerned. A comparison is performed in Step 120, ind1<neigbor1. If the answer is "No", controls transfers to Step 125, "Generate Solutions", described herein below in FIG. 18. Step 130, displays the final solutions, and then the "Partial trajectory recognition and prediction" module 100 is ended.

If the comparison in Step 120 between ind1<neighbor1 is "Yes", control is transferred to Step 135 index value ind2=1, where ind2 is initialized to 1. Ind2 is the index of the sub-word last letter, Neighbor2 is an integer number, generally equal to 4, which corresponds to the number of candidates as far as a last letter of a sub-word is concerned (By definition, the last letter of a sub-word is an intermediate letter of a full long word solution). In Step 140, ind2<neighbor2 ind2 is compared to neighbor2. If the comparison in Step 140 between ind2<neighbor2 is "Yes" control is transferred to Step 145 "A" and then Step 146 "B", before ind2 is incremented in Step 150 "ind2++". "A" and "B" refer to the entire "Sub-word selection" module flowchart, which is the core of embodiments of the present invention, shown in FIG. 17 and described hereinbelow.

Returning to Step 140, if the comparison between ind2<neighbor2 returns "No" (meaning that all the neighboring letters of the last letter were examined) control is transferred to Step 155 "ind1++", meaning that ind1 is incremented. If in step 120 the comparison between ind1<neighbor1 is "No" (meaning that all the neighboring letters of the word first letter were examined) control is transferred to Step 125, proceeding as described hereinabove.

Figure 17:
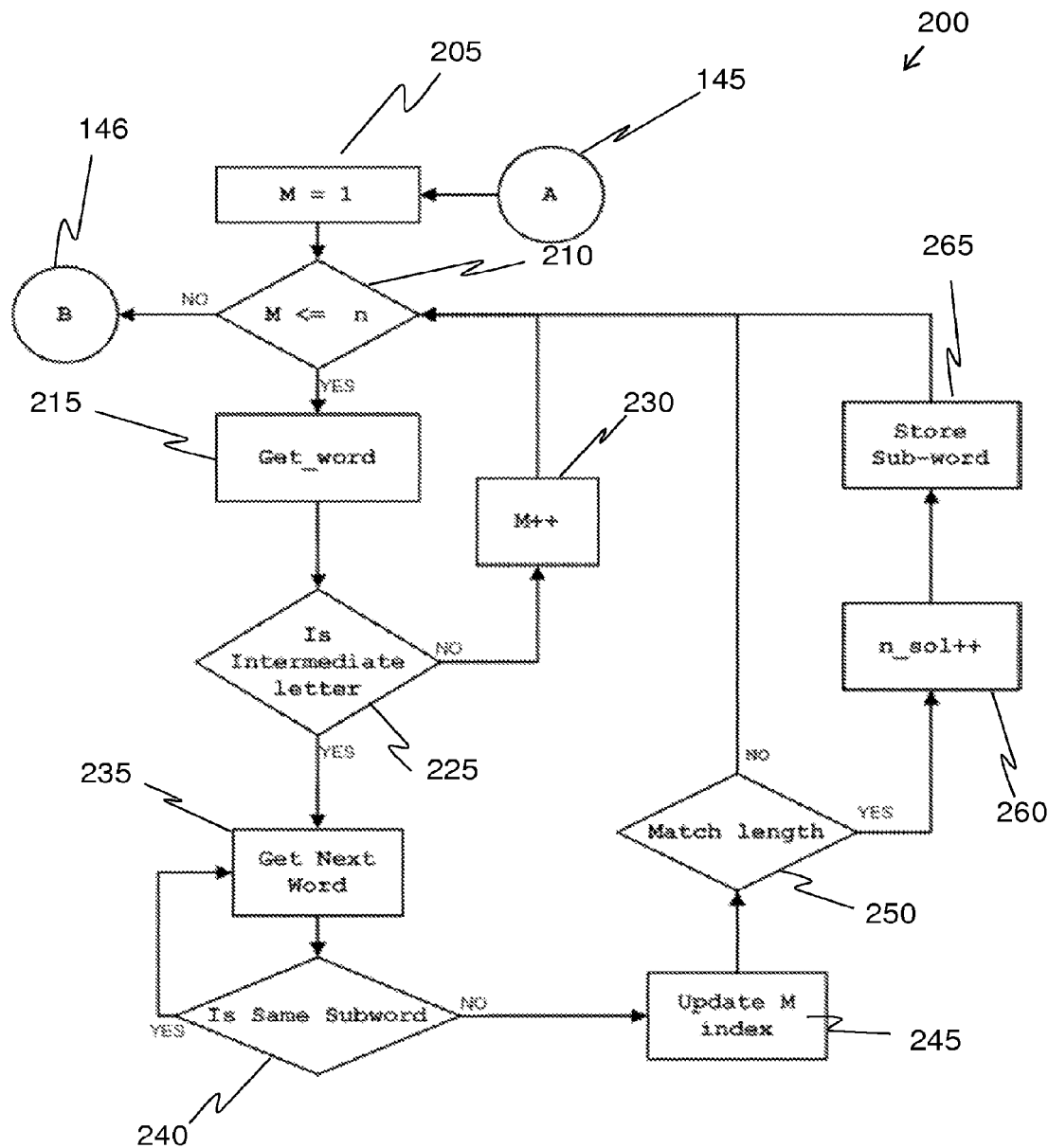
FIG. 17 is a flow chart showing the steps of sub-word selection, in accordance with an embodiment of the current invention.

Reference is presently made to FIG. 17, which is a flow chart showing the steps of sub-word selection 200, in accordance with an embodiment of the current invention. Apart from differences described below, Steps 145 and 146 are identical in notation, configuration, and functionality to that shown in FIG. 16, as described herein above. The steps of sub-word selection 200 are collectively referred to as the "Sub-word selection module". The sub-word selection module is applied in situations similar to those discussed hereinabove in FIGS. 1-15, when a long press is made after tracing a trajectory. The module inputs are trajectory coordinates as well as the first and last letter indices ind1, ind2 (refer to FIG. 16).

In Step 205 M=1, index M is initiated at a value=1 and is subsequently incremented from 1 to n, with n being the number of words belonging to class ind1 of the LWD. In Step 210 M<n, M and n are compared. If M is greater than n, control is transferred to step 146 "B" (ref FIG. 16). If M is less or equal than n, control proceeds to the next step, 215 Get_word.

In Step 215, Get_word, M is used to find a full long word from the ind1 class of the LWD (i.e. All full words starting with the ind1 index letter). In Step 225, Is_Intermediate_Letter, a check is made whether the intermediate letter corresponding to former value ind2 is part or not part of the extracted full long word. Additionally, when the intermediate letter appears more than once in the full long word, the location of the intermediate letter within the long word which is chosen is the letter having the partial trajectory best corresponding to the user's input (refer to description and explanation hereinabove regarding sub-words "eradi" and "eradicati").

If the long word found does not include the intermediate letter, the word is rejected, meaning "No" is returned from step 225, and M is incremented in Step 230, M++, with control then returned to Step 210 (as described hereinabove).

When in Step 225 the answer is "Yes", this means that the intermediate letter corresponding to former index ind2 is part of the found full long word and control is transferred to Steps 235, "Get Next Word", and 240, "Is same sub-word", to find all the full long words which start with the sub-word. The combination of Steps 235 and 240 is referred to herein as the "Get next word module".

The Get next word module takes advantage of the sorting arrangement (according to keyboard, as previously described) of the LWD and it serves to search for all subsequent long words starting with the same sub-word. The index value M is returned in Step 245, "Update M index", along with the higher frequency of usage of all the words starting with the current sub-word. This frequency will be attached to the sub-word, and later at the recognition stage it will allow to build the matching distance between the sub-word and the corresponding user input (see above the discussion as far as sub-word "excl" is concerned).

In Step 250, "Match length", the filter unit described above is applied to the candidate sub-word, according to the filters described in '786, namely:

The curvilinear length of the input trajectory is compared to the generated length of the sub-word candidates;

When the user describes a trajectory composed of inflection points, to each inflection point corresponds a group of letters in which at least one of the letters must belong to the sub-word candidate;

Sub-words smaller than x letters or greater than y letters. The x and y values are arbitrary, with defaults of x=3, y=20. Note that when x=1 and y=25 all the words of the Dictionary are included in the LWD; and in this case, all the dictionary words (even short words) could similarly be predicted.

A sub-word may be rejected by any of the above-listed three filters in Step 250 If a sub-word passes the three filters, in Step 260 "n_sol++" n_sol (number of solutions) is incremented, and the sub-word and its associated frequency are stored in Step 265 "Store sub-word".

As further described hereinbelow in FIG. 18, the n_sol sub-word candidates are sent to the "Sub-word Recognizer"

module which orders the sub-words according to matching distance scores as defined in '786'.

Figure 18:
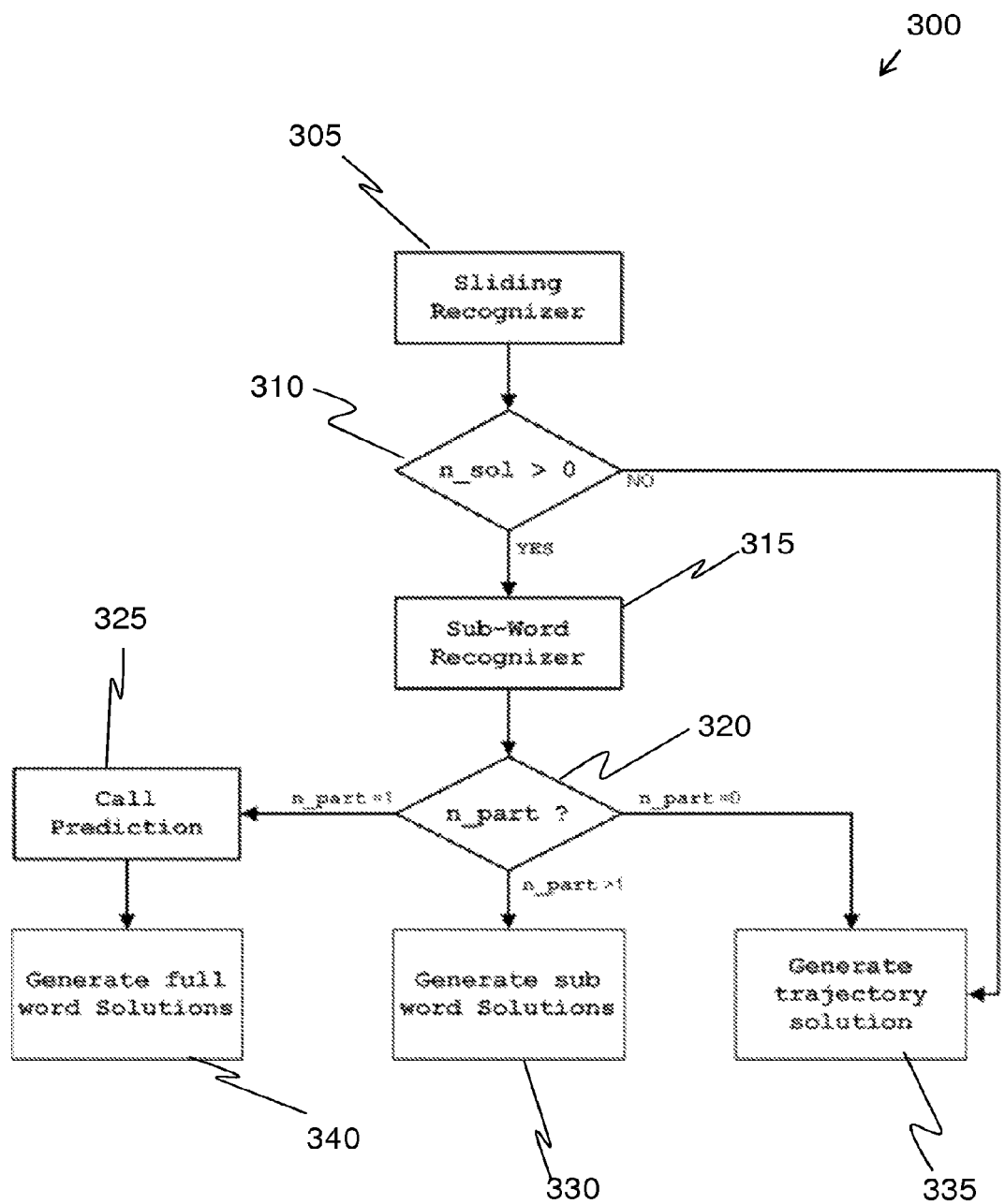
FIG. 18 is a flow chart showing the steps of a solution generation process, in accordance with an embodiment of the current invention.

Reference is presently made to FIG. 18, which is a flow chart showing the steps of a solution generation process 300, in accordance with an embodiment of the current invention. The steps of solution generation process 300 are collectively referred to as the "Solution generation module". Solution generation process 300 is triggered after all the sub-words solutions are stored, as indicated hereinabove in FIG. 17. The object of the solution generation module is to perform two recognition tasks, in Steps 305 and 315, as described hereinbelow. Sliding recognizer, Step 305 and sub-word recognizer, Step 315 are one in the same; however the nature of the input and output in each case is different.

Step 305 "Sliding Recognizer" represents recognition process, as described in '786, in which word solutions belonging to the Dictionary are generated when the input is a tracing trajectory. Corresponding solutions are full word solutions. The solutions are the same disambiguated solutions which would have been generated whether the user had fingered up immediately instead of performing a long press.

In Step 310, "n_sol>0", when "Yes" is returned, control is transferred to Step 315, "Sub-word Recognizer" whenever the number of sub-words is greater than zero. (Recall that n_sol is a counter created, ref FIG. 17 hereinabove, at Step 265, representing the number of sub-words candidates.) The inputs to the Sub-word Recognizer are the stored sub-words and respective frequencies. Output from Sub-word Recognizer includes the sorted sub-words according to their matching distance scores. The solutions generated by the Sub-word Recognizer are displayed terminating with two periods, as described hereinabove in FIGS. 1-15.

In Step 310, when n_sol=0, control is transferred to Step 335, "Generate Trajectory solution", where all the disambiguated solutions found by the sliding Recognizer module 305 are generated. This situation was described in FIGS. 11 and 12 hereinabove. If the number of disambiguated solutions is equal to 0, then there are no solutions to generate and display. User action/input will presently not trigger any activity. If the user presently fingers up, there is an indication that there are no solutions corresponding to the present tracing trajectory.

The variable n_part represents number of sub-words which were not rejected in Step 315. In Step 320, if n_part=0 control is transferred to Step 335 "Generate Trajectory solution", wherein all the full word solutions corresponding to the trajectory are generated, as further described hereinabove.

If in Step 320, n_part=1 means only a single sub-word was found, control is transferred to Step 325 "Call Prediction" where all the full words starting with this single sub-word are generated. (This case is described in FIG. 2, in which only a single sub-word was found namely "encyc . . . " and solutions "encyclopedia", "encyclical" were found).

If in Step 320, n_part>1, control is transferred to Step 330, "Generate sub word Solutions", in which the corresponding sub-words solutions are generated (refer to FIGS. 1 and 5).

When there is a more than one disambiguated solution found by Sliding Recognizer 305, the first solution generated is having the best score. (Refer to FIG. 1, in which word "envy" corresponds to the full tracing trajectory and is followed with the sub-words solutions namely: "ency . . . ", "encu . . . ", . . . ", "encry . . . ".) Note that the best full word solution is added also in Step 325 when there is only a single sub-word solution.

Input for the Prediction Module in Step 325 comprises a single sub-word previously stored (refer to Step 265 in FIG. 17) or when a sub-word, solution terminating with 2 periods, is chosen by the user (refer to FIGS. 6 and 7). The classes of the LWD which start with the first character of the input sub-word are examined. All words starting with the same letters of the sub-word are selected and stored with their respective associated frequency of usage. Selected solutions are then sorted according to their frequency. The first solutions (i.e. the solution having the highest frequency) are generated in step 340 (refer to FIGS. 1-8).

In an embodiment of the current invention, as previously noted, the LWD is not necessary and a database management tool, such as but not limited to SQLITE, can utilize commands to be used to obtain full word predictions corresponding to sub-words from the Dictionary, alone. As an example if a chosen sub-word is "const" the SQLITE command is as follows:

select word, frequency from DB where word like 'const%' order by frequency

The full words sorted by their frequencies and starting with the sub-word 'const' are subsequently returned.

The flow charts shown in FIGS. 16-18 hereinabove include any mixing of tapping and sliding (or vice-versa) when inputting a word. In all cases, a single trajectory serves as the input to the algorithms, irrespective of the sequence of tapping and sliding.

Sliding Followed by Tapping

After partial sliding ended with a long press the system suggests few sub-word solutions corresponding to the tracing trajectory. When the user chooses one of these suggestions he can continue the chosen sub-word by tapping the end of this word.

Tapping Followed by Sliding

After tapping a sub word, the user can finish the word with sliding. By making a long press on the next letter of the sub-word, the system knows that it is a continuation of the previous tapped sub-word and the system then generates the ideal tracing trajectory corresponding to the sub-word. When the user continues the sub-word by sliding the new sliding trajectory will be added to the previous ideal generated trajectory and this global trajectory will be analyzed by the System as a full trajectory as described in FIG. 14.

Partial Sliding Followed by Partial Sliding

Similarly when a sliding trajectory ends with a long press and the user choose one of the sub-word solutions, he can finish the word with another partial sliding starting with a long press on the next letter of the sub-word as described in FIG. 15.

In the above descriptions many local text formats are suggested, such as: style (underline), colors, banner arrangements, inter alia. The formats are exemplary in nature and any other representations fall in the scope of embodiments of the present invention.

With regard to the "monotonous method" described in '786, in embodiments of the present invention, other recognition methods are included, such as, but not limited functions of: least square fits, polynomial; and others known in the art.

It will be appreciated that the above descriptions are intended only to serve as examples, and that many other embodiments are possible within the scope of the present invention as defined in the appended claim

The invention claimed is:

1. A method for predicting a full word solution corresponding to a partial trajectory pattern, comprising:
   receiving a partial word trajectory pattern input by a user via a keyboard that has a plurality of virtual keys displayed on an electronic device, the partial word trajectory pattern resulting from movement of a pointing device by the user from one virtual key to other virtual keys on the displayed keyboard, while the pointing device is maintained in contact with the keyboard;

evaluating the partial word trajectory pattern to generate a partial word solution that comprises two or more letters of a longer word; and utilizing the partial word solution to extract, from a dictionary that includes a set of words and respective frequencies of usage, a predicted full word solution having a highest frequency of use, wherein the dictionary is derived from a dictionary database, stored in a memory of the electronic device, that includes a set of words and respective frequencies of usage, and wherein the dictionary is smaller in size than the dictionary database, and includes words satisfying a minimum character threshold value.

2. The method of claim 1, wherein generating a partial word solution further comprises using a preceeding tapped entry of one or more virtual keys by the user to generate the partial word solution.

3. The method of claim 1, wherein the pointing device comprises a finger, a mouse, a remote control, or a pen.

4. The method of claim 1, wherein the dictionary includes words having a minimum character threshold value of eight characters, and is configured according to an arrangement of the plurality of virtual keys on the keyboard.

5. The method of claim 1, wherein the dictionary further comprises a length parameter reflecting a minimum length of each word in the dictionary and a frequency parameter reflecting a minimum frequency of use of each word in the dictionary.

6. The method of claim 5, wherein the dictionary is derived from the dictionary database by scanning the dictionary database and selecting all words having a length that is at least equal to the length parameter and a frequency of use that is greater than or equal to the frequency parameter associated with the dictionary.

7. The method of claim 1, wherein evaluating further comprises selecting the partial word solution from the dictionary using filters.

8. The method of claim 7, wherein the filters include:
a first filter that identifies partial word solution candidates from the dictionary based on candidate first characters corresponding to the partial word trajectory pattern, wherein the candidate first characters comprise the first character of the partial word trajectory pattern and at least one character neighboring the first character;
a second filter that eliminates partial word solution candidates that do not include as an intermediate character candidate last characters corresponding to the partial word trajectory pattern, wherein the candidate last characters comprise the last character of the partial word trajectory pattern and at least one character neighboring the last character; and
a third filter that eliminates partial word solution candidates that do not include as intermediate characters corresponding to inflection points of the partial word trajectory pattern.

9. The method of claim 8, wherein the last character of the partial word trajectory pattern is denoted by a long press by the user during input of the partial word trajectory pattern.

10. The method of claim 1, wherein the set of words in the dictionary are grouped in classes, each class including full words starting with the same character sorted according to an arrangement of characters on the keyboard.

11. An electronic device implementing a method for predicting a long word solution corresponding to a partial word trajectory pattern, comprising:
a memory storing computer-executable instructions; and
a processor for executing the computer-executable instructions stored in the memory, the computer-executable instructions including:
instructions for receiving an input via a virtual keypad on an electronic device, the input representing a partial word trajectory pattern, the partial word trajectory pattern resulting from movement of a pointing device by the user from one virtual key to other virtual keys on the displayed keyboard, while the pointing device is maintained in contact with the keyboard;
instructions for accessing a long word dictionary to generate a partial word solution corresponding to the partial word trajectory pattern, wherein the long word dictionary includes a subset of words derived from a dictionary database and that have a number of characters that meet or exceed a minimum character threshold value; and
instructions for utilizing the long word dictionary in conjunction with the partial word solution to generate a predicted long word solution.

12. The electronic device of claim 11, further comprising:
instructions for generating the long word dictionary from the dictionary database, wherein the long word dictionary comprises long words and respective frequencies of usage.

13. The electronic device of claim 12, wherein the instructions for generating the long word dictionary further comprises:
instructions for scanning the dictionary database to select long words having a number of characters at least equal to a length parameter and a frequency of usage greater than or equal to a frequency parameter.

14. The electronic device of claim 13, wherein a size of the long word dictionary is determined by at least the length and frequency parameters.

15. The electronic device of claim 12, wherein the long words in the long word dictionary are grouped in classes, each class including long words starting with the same character sorted according to an arrangement of characters on the virtual keypad.

16. The electronic device of claim 15, wherein the instructions for utilizing the long word dictionary in conjunction with the partial word solution to generate the predicted long word solution further comprises:
instructions for detecting long word solution candidates matching the partial word solution by scanning a class of the long word dictionary including a sorted list of long words that start with the same character as the partial word solution; and
instructions for selecting a long word from the long word solution candidates that has the highest frequency of usage as the predicted long word solution.

17. The electronic device of claim 16, further comprising:
instructions for detecting candidate first characters in the partial word trajectory pattern and scanning each class corresponding to the candidate first characters for partial word solution candidates, wherein the candidate first characters correspond to a key on the virtual keypad detected as being tapped or traced using a pointing device and one or more neighboring keys thereof.

18. The electronic device of claim 17, further comprising:
instructions for selecting the partial word solution from the partial word solution candidates by:

eliminating partial word solution candidates that do not include as an intermediate character candidate last characters of the partial word trajectory pattern; and eliminating partial word solution candidates that do not include as intermediate characters inflection points in the partial word trajectory pattern.

19. A method for predicting a full word solution corresponding to a partial word trajectory pattern, comprising:

receiving text input from a virtual keyboard displayed on an electronic device, the text input corresponding to a partial word trajectory pattern created by moving a pointing device from one key to the next on the virtual keyboard;

generating from the partial word trajectory pattern a partial word solution; and utilizing the partial word solution to extract, from a dictionary, associated with the virtual keyboard, which includes words having a number of characters that meet or exceed a minimum character threshold value and their associated frequencies of use, full word solutions and respective frequencies of usage;

selecting, from the full word solutions, a full word solution having the highest frequency of usage as a predicted full word solution.

20. The method of claim 19, wherein the dictionary is derived in real-time from a dictionary database that comprises words and respective frequencies of usage, and wherein the extracting is performed by issuing a command using a database management tool that includes SQLITE.

\* \* \* \* \*